(12) United States Patent
Trevithick et al.

(10) Patent No.: US 9,168,962 B2
(45) Date of Patent: Oct. 27, 2015

(54) DRILL RIG RELOCATION SYSTEM

(71) Applicant: T&T Engineering Services, Inc., Tomball, TX (US)

(72) Inventors: Mark W. Trevithick, Houston, TX (US); Gary Firth, Hockley, TX (US); Robert Metz, Cypress, TX (US); Bob Williams, Katy, TX (US); James Zapico, Houston, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 0 days.

(21) Appl. No.: 14/590,936

(22) Filed: Jan. 6, 2015

(65) Prior Publication Data

US 2015/0166134 A1    Jun. 18, 2015

Related U.S. Application Data

(63) Continuation-in-part of application No. 13/767,571, filed on Feb. 14, 2013, now Pat. No. 8,925,658.

(60) Provisional application No. 61/598,789, filed on Feb. 14, 2012.

(51) Int. Cl.
*B62D 57/02* (2006.01)
*E21B 15/00* (2006.01)
*E21F 13/00* (2006.01)

(52) U.S. Cl.
CPC ............. *B62D 57/02* (2013.01); *E21B 15/003* (2013.01); *E21F 13/006* (2013.01)

(58) Field of Classification Search
CPC ............. E02F 9/04; E02F 9/10; B62D 57/00; B62D 57/02; E21F 13/006; E21B 15/003
USPC ................... 180/8.1, 6.48, 8.5, 8.6; 280/761
See application file for complete search history.

(56) References Cited

U.S. PATENT DOCUMENTS

| | | | |
|---|---|---|---|
| 2,660,253 A | 11/1953 | Davidson |
| 2,914,127 A | 11/1959 | Ricouard |
| 3,576,225 A | 4/1971 | Chambers |
| 3,693,363 A | 9/1972 | Van den Kroonenberg |
| 3,703,968 A | 11/1972 | Uhrich et al. |
| 3,807,519 A | 4/1974 | Patch |
| 3,866,425 A | 2/1975 | Morrice |
| 4,029,165 A | 6/1977 | Miller et al. |
| 5,921,336 A | 7/1999 | Reed |
| 6,234,527 B1 | 5/2001 | Poulin et al. |
| 6,581,525 B2 | 6/2003 | Smith |
| 7,681,674 B1 | 3/2010 | Barnes et al. |
| 7,806,207 B1 | 10/2010 | Barnes et al. |
| 7,819,209 B1 | 10/2010 | Bezner |
| 8,051,930 B1 | 11/2011 | Barnes et al. |
| 8,490,724 B2 | 7/2013 | Smith et al. |
| 2009/0283324 A1 | 11/2009 | Konduc et al. |

*Primary Examiner* — Joseph Rocca
*Assistant Examiner* — Michael Stabley
(74) *Attorney, Agent, or Firm* — John G. Fischer, Esq.; Scheef & Stone, L.L.P.

(57) ABSTRACT

The present invention discloses a drill rig relocation system. Lift frames are provided as add-ons to existing drill rigs, or as integral openings within the length of the base boxes. A lift cylinder and bearing mat assembly is connected beneath the lift frame or base boxes. Each bearing mat assembly has a slew drive for controlled directional rotation. A torque arrest system allows vertical movement of the torque reaction point as the substructure is elevated to control the orientation and magnitude of forces. In one embodiment, the drill rig is supported on linear sleeve bearings slideably mounted in the bearing mat assemblies. Translation cylinders on the bearing mats expand to move the drill rig by translating the linear sleeve bearings along the shafts.

17 Claims, 20 Drawing Sheets

DRILL RIG RELOCATION SYSTEM

CROSS-REFERENCE TO RELATED APPLICATIONS

This application is a continuation-in-part of U.S. application Ser. No. 13/767,571, now U.S. Pat. No. 8,925,658, and claims the benefit of priority to Provisional Patent Application No. 61/598,789 filed Feb. 14, 2012.

TECHNICAL FIELD OF INVENTION

The present invention relates to a relocation system for heavy equipment over natural terrain. The invention enables, for example, a drill rig to be self-relocating on property where multiple wellbores are to be drilled within the immediate vicinity. In particular, the invention provides a drill rig relocation system for which the slide mechanism utilizes linear sleeve bearings engaged on cylindrical slide pairs, where the bearings are beneath a housing cover that provides a contaminant resistant environment. The housing cover is connected to a slew drive that controls rotation of the mat assemblies at each corner of the base boxes. A torque arrest system allows vertical movement of the torque reaction point as the substructure is elevated to control the orientation and magnitude of forces.

BACKGROUND OF THE INVENTION

In the exploration of oil, gas and geothermal energy, drilling operations are used to create boreholes, or wells, in the earth. Drill rigs used in subterranean exploration must be transported to the locations where drilling activity is to be commenced. These locations are often remotely located and in rough terrain. The transportation of such rigs on state highways requires compliance with highway safety laws and clearance underneath bridges or inside tunnels. Once transported to the desired location, large rig components must each be moved from a transport trailer into engagement with the other components located on the drilling pad.

Moving a full-size rig and erecting a conventional mast and substructure generally requires the assistance of large cranes at the drilling site. The cranes will be required again when the exploration activity is complete and it is time to take the rig down and prepare it for transportation to a new drilling site. Once the cranes have erected the mast and substructure, it is necessary to reinstall much of the machinery associated with the operation of the drill rig. Such machinery includes, for example, the top drive with mud hose and electrical service loop, AC drawworks, rotary table, torque wrench, standpipe manifold, and BOP. Movement of rig masts from transport trailers to engagement with substructures remains time consuming and difficult.

For the purpose of optimizing the economics of the drilling operation, it has become the practice to drill several directionally controlled wells from a single lease. As a result, the drill rig need only be moved a few feet. This optimizes the value of the lease, and vastly reduces down time from transportation. Offshore operations on fixed platforms made this common practice several decades ago, by placing drill rigs on a rail system, such as at THUMS Islands off the coast of Long Beach, Calif. However, in conventional land drilling operations, it is necessary to move the rig across natural terrain without minimal disassembly of the drill rig.

To achieve this movement, the conventional practice has been to use lifting pads at the corners of the base boxes. In this manner, a fully constructed drill rig can be moved a few feet at a time, until it is positioned over the next wellbore location. Drill rigs can be moved by means of lift pods for many years. Various patents have issued relating to drill rig relocation devices.

For example, U.S. Pat. No. 2,660,253 to Davidson describes an apparatus in which a platform rests on a base, with rails fixed to the underside of the base to provide horizontal travel and the base supported by vertical jacks. In operation, different sets of the jacks alternate extension and refraction. Hydraulics attached to the rails then move the base relative to a pontoon to move the entire platform in a forward direction. The device disclosed in Davidson leaves the rails that comprise the load bearing element and provide longitudinal displacement unprotected and exposed to the elements, which can lead to environmental contamination, increased friction, vibration, increased wear, and reduced life. The increased frictional load upon the rails eventually degrades horizontal travel performance of the apparatus.

U.S. Pat. No. 2,914,127 to Ricouard discloses a mobile platform for supporting heavy equipment comprising a chassis provided with a number of rollers rotatably mounted on spindles fixed to the chassis by supports. The rollers roll along a runway comprising a rigid rail with a base-plate forming a support face capable of supporting the machine. The machine operates by initially resting on the rails with the jacks supplied with pressure so as to extend and come into contact with the ground to raise the chassis. The chassis is then rolled along the track by way of the rollers. When the runway reaches the end of its travel, the chassis is lowered by acting on the jacks until the runways once again rest on the ground. The mechanism utilized by Ricouard poses a number of limitations, namely the rollers that bear the load of the chassis and provide horizontal locomotion of the mechanism are left unprotected and exposed to the elements, which would eventually accumulate contaminants and require maintenance. Contaminants and other debris present in the working condition of such machinery would also increase the variability of the friction forces opposing horizontal movement.

U.S. Pat. No. 3,576,225 to Chambers teaches a module and system for moving objects over the ground and employing separate modules that are supported by vertical jacks. The vertical jacks are extended, lifting the module off the ground. At least one of the vertical jacks further includes a sliding horizontal assembly slidable on a flat, lubricated interface. During operation, vertical jacks alternate support of the modules with the horizontal jacks, with horizontal movement of the module facilitated by shifting of the horizontal jack when the horizontal jack provides support for the module. In Chambers, the lubricated load bearing interface of the horizontal jack that supports the modules is directly exposed to the elements, and left unprotected to accumulation of dirt, rocks and other contaminants present in the environment. After passage of time, the lubricated interface may become contaminated due to such exposure, resulting in greater variable coefficient of friction and more difficulty for the horizontal jack to facilitate movement.

U.S. Pat. No. 6,581,525 to Smith teaches a load carrying transport apparatus for moving heavy loads, such as a drill rig. The apparatus of Smith provides a substructure for carrying the rig, including a pair of spaced apart frame structures which support the rig and an elongate track or sub beam, which is positioned on the surface, and upon which the frame structures are rolled along when lifted. Lift assemblies with associated rams and roller assemblies on the ends provide both vertical support and horizontal movement. The roller assemblies include a plurality of rollers rotatable around a horizontal axis, similar to a caterpillar track. The main beams are then displaced by rolling them along the sub beams that are laid on the surface beforehand for moving the rig. Due to the design of Smith, the roller assemblies that bear the load of the transport apparatus are in close proximity to the ground surface and left unprotected from dust, dirt and other elements. As such, the roller assemblies will eventually become worn and obstructed as foreign matter accumulates and grinds against the roller assemblies. This leads to eventual required maintenance and repair which renders the apparatus unavailable for some time.

Furthermore, several other prior art references also make use of various roller assemblies or related mechanisms to bear the load of the structures during the horizontal movement of the transportation or relocation apparatuses. For instance, U.S. Pat. No. 3,807,519 to Patch discloses a walking mechanism for moving a ground-engaging device over open terrain which uses one example of such a roller assembly. The mechanism of Patch includes support pads and plates. The plate and support pad are provided to permit longitudinal movement relative to the device. Roller means are disposed between the plate and pad to support the mechanism and facilitate longitudinal movement. The roller means include a plurality of longitudinally aligned rollers secured as a unit by channels through associated center axles.

Another instance of a prior art disclosing a roller assembly for longitudinal movement is U.S. Pat. No. 5,921,336 to Reed, which discloses a walking substructure device with a plurality of lifting jacks, with each jack having an upper end connected to the substructure and a lower end connected to a roller assembly which bears the weight of the lifting jack, and consequentially, the substructure. The apparatus of Reed operates to move the substructure by incremental displacement of the substructure via the roller assembly. The roller assembly supports the walking substructure and rolls on a center beam of a jack pad. A push-pull mechanism in the form of a pair of hydraulic cylinders extends between each jack pad and roller assembly in order to move the roller assembly relative to the center beam.

U.S. Pat. Nos. 7,681,674, 7,806,207 and 8,051,930 to Barnes each teach a walking vehicle for positioning and transporting relocatable equipment. The vehicle has at least four walking assemblies attached to a frame, with a pad attached to the surface contacting end. The walking vehicle of Barnes further discloses a push-pull traveling system for providing the movement of the walking assembly. The weight of the walking vehicle is supported by a roller assembly located in a housing with a central collar. During operation, the push-pull traveling system of Barnes pushes the rollers of the roller assembly, like a tank tread on top of a roller bearing surface. In this fashion, the vehicle can walk in a first direction.

In the Patch, Reed and Barnes series of references, the mechanism for bearing the load of the device is by way of a set of rollers, which are not sealed to the elements and may eventually become affected by debris and other materials present in the environment which the devices operate. As a result of the substantial load being placed upon the rollers, the rollers are susceptible to the additional particulates, which may create additional frictional forces between adjacent rollers. This leads to more variable coefficient of friction at the roller contact surfaces wherein one load bearing assembly may become more difficult to translate in a horizontal direction, thus adversely affecting the synchronous movement of the entire structure. What is needed then is a walking assembly that can facilitate horizontal movement evenly throughout the entire movement and maintain the assembly in a contaminant-free environment so as to prevent the contamination problems typically associated with the prior art.

It remains highly desirable to transport a drill rig short distances in a manner that avoids contamination of the frictional sliding surfaces with environmental elements. It is also desirable to transport a drill rig short distances with multiple devices that provide consistent and low frictional resistance at each device. For this purpose, it is also desirable to provide a system that includes a lubricant reservoir in communication with the sliding surfaces. It is further desirable to have the reservoir fully sealed from the surrounding environment. It is also desirable to have a device that is stable and self-centering, without external guides. It is also desirable to provide a device with a smooth sliding action that avoids vibration from irregularities. It is also desirable to have a device having a slide mechanism with a low vertical profile.

In summary, the preferred embodiments of the present invention provide a unique solution to the engineering constraints and environmental challenges of providing a durable, low-profile rig moving system that is protected from environmental contamination and provides a smooth, low friction sliding, low-energy action that prevents damage to the drill rig and the rig moving system.

SUMMARY OF THE INVENTION

The present invention provides a substantially improved system for relocation of a drill rig. In one embodiment, a drill rig relocation system comprises a lift frame connectable to each end of a pair of base box sections of a drill rig substructure. In another embodiment, the lift frame is a space located within the length of a base box. A lift cylinder is connected to each lift frame. Each lift cylinder has an extendable shaft with an extendable end. A bearing housing is rotatably connected to the extendable end of the lift cylinder. A lock plate is connected to the bearing housing.

A lock bar is selectively connected to the lock plate to lock the lock plate in a predetermined rotational position relative to the lift frame. A bearing mat is provided, having a ground side and an opposite top side. A slide housing extends above the top side of the bearing mat. A cylindrical slide shaft is supported by the slide housing. A linear sleeve bearing is mounted in the bearing housing, and positioned on the slide shaft in slidable relation. An extendable translation cylinder is connected at one end to the top side of the bearing mat, and connected at its opposite end to the lock plate.

In another embodiment, a pair of generally vertical flanges are provided on an inside portion of the lift frame. An aperture is located on each flange, and the apertures are pin connectable to matching apertures on the base box to permit removal and separate transport of the lift frames.

In another embodiment, a thrust plate is mounted to the lift frame, and has an opening for receiving the extendable shaft. A preload plate secures the lift cylinder to the thrust plate.

In another embodiment, a spherical bearing end is located on the end of the extendable shaft of the lift cylinder. A circumferential relief is provided on the extendable shaft. A load plate forms the top of the bearing housing. A cavity in the load plate receives the spherical bearing end in rotatable engagement. A bearing retainer is located in the relief of the shaft, and the bearing retainer is connected to the load plate.

In another embodiment, the bearing housing has a plurality of linear sleeve bearings mounted in orifices on the bearing housing. A plurality of cylindrical shafts is mounted between pairs of slide bearings.

In another embodiment, the bearing housing is comprised of a bearing frame having a plurality of orifices. The slide bearings are mounted in the orifices, and a load plate is provided on top of the bearing frame. The bearing housing forms an enclosure over at least a portion of the cylindrical slide shaft and over all of the slide bearings.

In another embodiment, a seal is provided substantially adjacent to each linear sleeve bearing in sealing and sliding engagement with a cylindrical shaft. The bearing housing thus forms a sealed enclosure over at least a portion of a cylindrical slide shaft and over all of the slide bearings.

In another embodiment, the sealed bearing enclosure is at least partially filled with a lubricant.

In another embodiment, a housing cover is attached to a top of the load plate such that the housing cover and slide housing form a secondary enclosure that substantially encloses the bearing housing and cylindrical shafts.

In another embodiment, a plurality of locate pins are attached to the lock plate such that the locate pins are selectively engageable with the lock bar. In this manner, they engage to lock the lock plate in a predetermined rotational position relative to the lift frame.

In another embodiment, a locate ring is attached to the lock plate, and a plurality of locate holes are located in predetermined locations on the locate ring. A key pin is provided on the lock bar such that the key pin is selectively engageable with the locate holes to lock the lock plate in a predetermined rotational position relative to the lift frame.

In another embodiment, a cylinder mat bracket is attached to the bearing mat, and a cylinder plate bracket is attached to the lock plate. A translation cylinder is connected at one end to the mat bracket and its opposite end is connected to the plate bracket.

In an alternative embodiment which is the subject of this application, the drill rig relocation system has an automatic rotation system. The rotation system replaces numerous components of the above described drill rig relocation system, such as a thrust plate, a lock plate and a lock bar. A cylinder flange may be used to secure attachment of the lift cylinder directly to the lift frame. The lift frame can be an integral component on each end of the driller's side base box and the off-driller's side base box, or alternatively mounted inboard of the ends of the base box to better distribute the vertical loads in the system. The lift frame can be any location along the base box and is not limited to the ends of the base box. In this manner, the weight distribution of the drill rig can be considered in determining an optimum location for the lift frame. As used herein, the lift frame can be a lift cylinder receiving slot on the base box with sufficient clearance for the bearing mat to rotate beneath it.

A control manifold is provided directly or remotely on each lift cylinder. A translation bracket is provided on, or integral to, the housing cover. Translation cylinders are connected at one end to the translation bracket. The translations cylinders are connected at their opposite end to the slide housing or otherwise to the mat assembly.

A slew drive is mounted to the housing cover. A torque arrest system is connected between the slew drive and the cylinder flange. The torque arrest system includes a first end of a torque link pivotally connected to the cylinder flange. A drive flange is securely connected to the slew drive. Spring links are pivotally connected at each end between the drive flange and a second end of the torque link. The spring links are shock absorbing. The spring links may contain a plurality of Belleville springs, and may be adjusted to set a preload on the spring link.

A drive motor is connected to the slew drive such that the actuating drive motor operates to rotate the slew drive and mat assembly relative to the lift assembly and base boxes. An encoder is connected to the slew drive to provide precise information as to the rotated direction of the mat assembly. A first stop and a second stop are connectable to the slew drive to provide maximum rotation points and for calibrating the range of motion for the encoder.

A primary advantage of the present invention is that it provides a primary containment volume for the linear slide bearings and an optional lubricant, preventing protection from environmental contaminants, providing a lower friction (lower force) and smoother sliding of the drill rig.

An advantage of the double cylinder embodiment of the invention is that it provides a highly stable double shaft-mounted assembly. Another advantage of the double cylindrical slide configuration is that it permits a lower assembly height which requires less clearance to the lift cylinder to obtain a desired ground clearance.

Another advantage of the invention is that the vertical loading distribution over linear sleeve bearings on cylindrical slides is more predictable when distributing over contaminated flat surfaces that are subject to rapid wear and distortion, creating uneven surface high points.

Another advantage of the invention is that it provides the option to use shafts of non-corrosive, stainless steel, requiring no chrome or other oxidation-resistant coatings or chemicals. Another advantage of the invention is that cylindrical shaft geometry allows use of highly reliable, low friction bushings, and ready access to the best bushing technology.

Another advantage of the invention is that bushing housing containment of grease using hydraulic cylinder seal-wiper technology maintains pristine shaft surfaces submerged in grease lubrication/bath, greatly reducing bushing and slide wear, and reducing maintenance.

Another advantage of the invention is that it provides a secondary containment region for the protection of the frictional surface from environmental contaminants. As will be understood by one of ordinary skill in the art, the detailed assemblies and sequence of the steps disclosed may be modified and the same advantageous result obtained.

A primary advantage of the alternative embodiments of the invention is that it permits hydraulically power rotational positioning of all four of the bearing mat assemblies. Another advantage is that it eliminates worker exposure to the hazards associated with manually positioning the bearing mat assemblies. Another advantage is that it provides an electronic read-out that provides a precise position indication of each bearing mat, reducing the potential for error and further increasing the safety of the workforce and the equipment.

Another advantage of the alternative embodiment is that it provides precise positioning of the drill rig at infinite rotational points. Another advantage of the alternative embodiment is that it provides an electronically controllable system with alarm points to prevent accidents.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
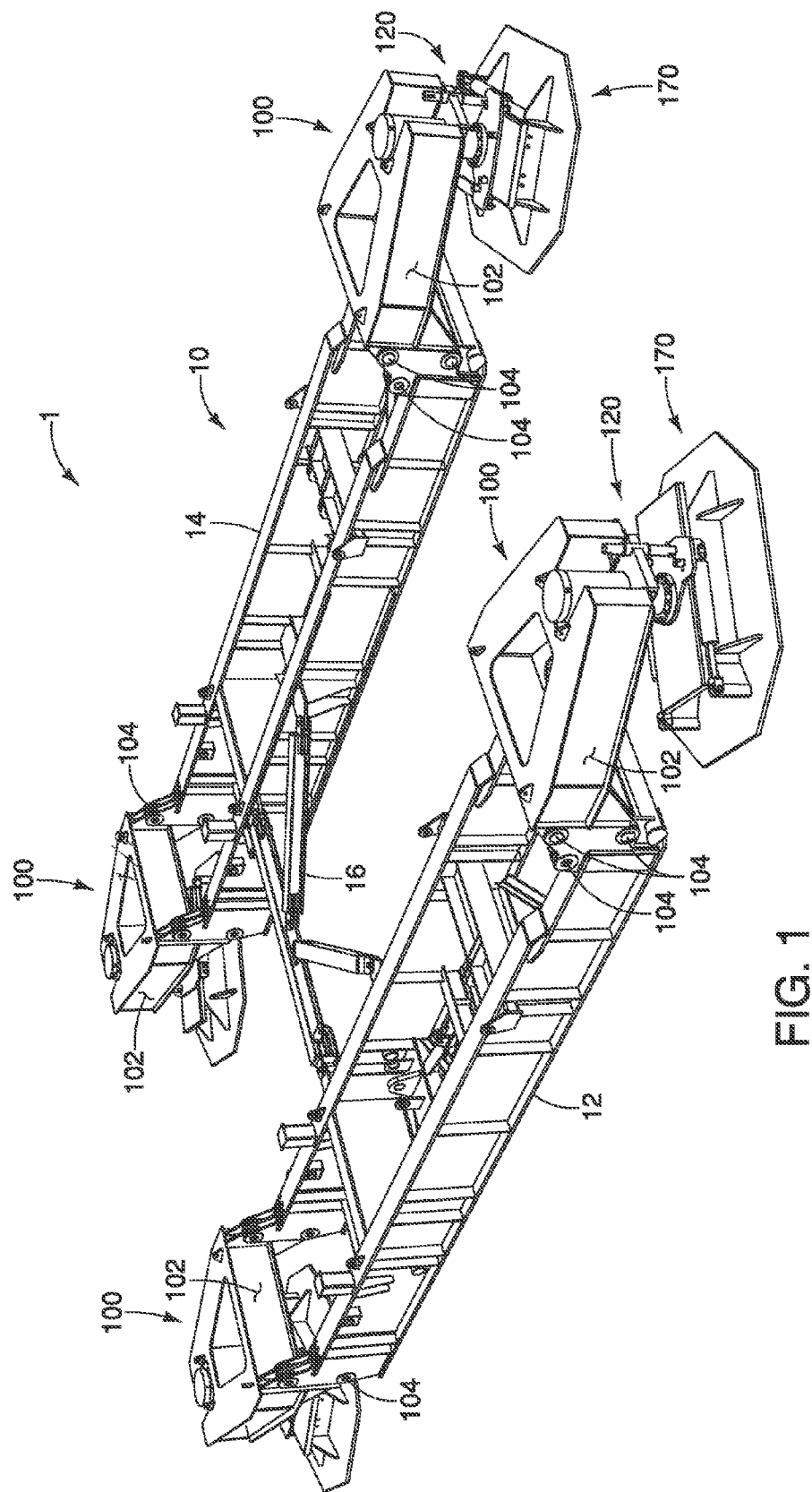
FIG. 1 is an isometric view of the drill rig relocation system having features of the present invention.

FIG. 1 is an isometric view of the drill rig relocation system 1 having features of the present invention. For visibility, FIG. 1 illustrates only the base box assembly of a drill rig 1. As shown in FIG. 1, a base box assembly 10 includes a driller's side base box 12 and an off-driller's side base box 14 separated by a base box spreader 16. A drill rig relocation system 100 is located at each end of driller's side base box 12 and off-driller's side base box 14.

Each lift frame 102 is connected to its respective end of driller's side base box 12 and off-driller's side base box 14 by multiple removable pins 104. In this manner, drill rig relocation systems 100 can be removed and transported separately of the base box section to reduce the transportation dimension and weight of driller's side base box 12 and off-driller's side base box 14.

Figure 2:
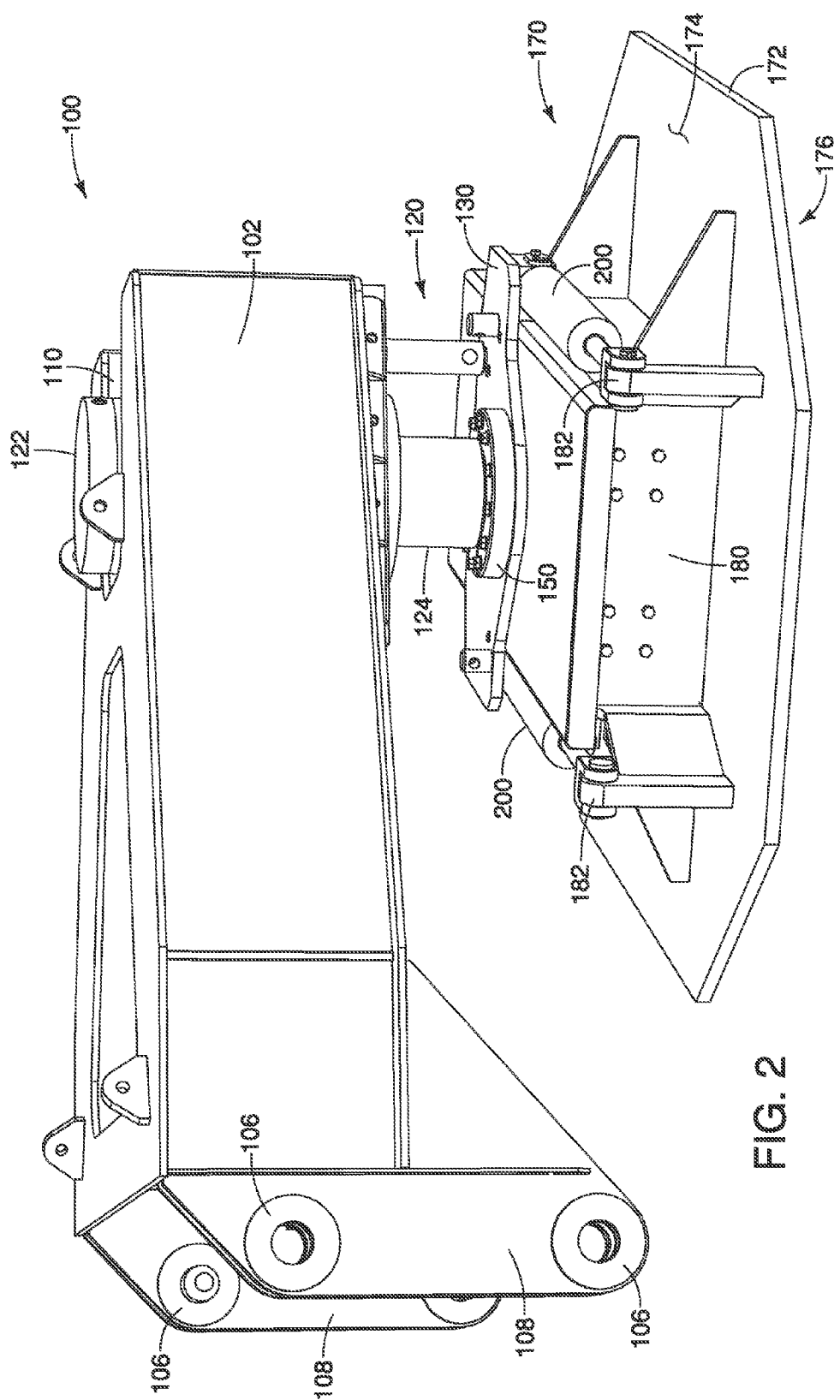
FIG. 2 is an isometric view of a drill rig relocation system as would be located on one corner of the base frame, having features of the present invention illustrated from a viewpoint slightly above the mechanism.

FIG. 2 is an isometric view of drill rig relocation system 100, as would be located on one corner of base box assembly 10, illustrated from a viewpoint slightly above mechanism 100. Lift frame 102 has a pair of flanges 108. Receptacles 106 are located on flanges 108 for receiving pins 104 for connection to an end of driller's side base box 12 or off-driller's side base box 14. In the preferred embodiment illustrated, lift frame 102 has an opening 110 on an end opposite flanges 108.

A lift assembly 120 is connected to lift frame 102. A mat assembly 170 is connected to the bottom of lift assembly 120. Lift assembly 120 is controllably expanded and contracted to control the vertical distance between lift frame 102 and mat assembly 170. A pair of translation cylinders 200 connects mat assembly 170 to lift assembly 120. Translation cylinders 200 are controllably expanded and contracted to control the horizontal distance between lift frame 102 and mat assembly 170.

Lift assembly 120 includes a lift cylinder 122 located in yoke opening 110. Lift cylinder 122 has an extendable shaft 124. Shaft 124 extends downward through a lock plate 130. Lock plate 130 has a shaft opening 132 for rotatable passage of shaft 124. A bearing retainer plate 150 vertically secures shaft 124 to lock plate 130 in horizontally rotatable relation. In this manner of connection, retraction of lift cylinder 122 raises lock plate 130 and all components of drill rig relocation system 100 that are attached thereto. Also, lock plate 130 and all components of drill rig relocation system 100 that are attached thereto may be rotated horizontally relative to shaft 124 of lift cylinder 122. This permits rotation of mat assembly 170 to choose the direction of movement of drill rig 1.

Figure 3:
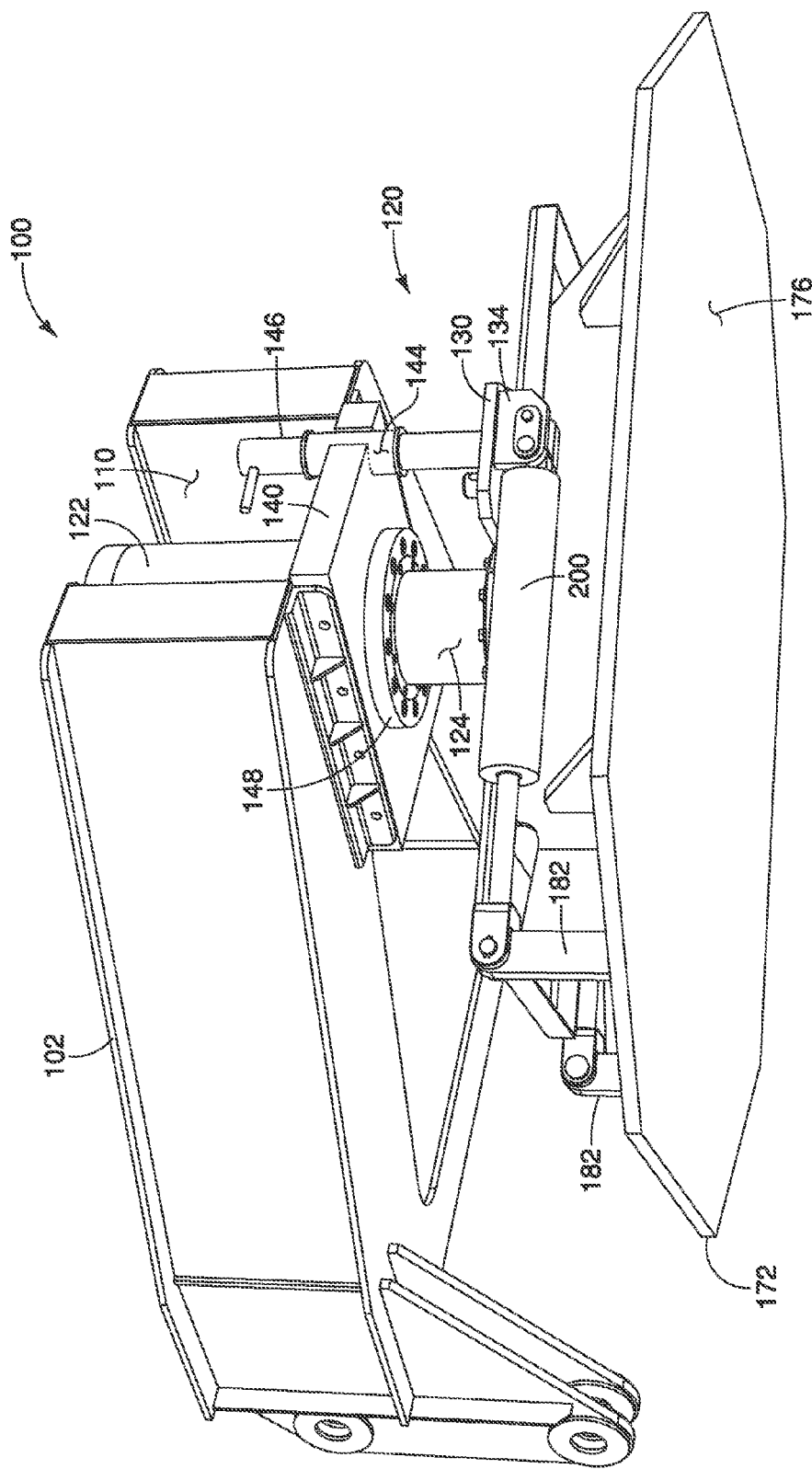
FIG. 3 is an isometric view of a drill rig relocation system as would be located on one corner of the base frame, having features of the present invention illustrated from a viewpoint slightly beneath the mechanism.

As seen in FIGS. 2 and 3, a lock bar 146 is movably located in a sleeve 144 of thrust plate 140. Lock bar 146 is engageable with locate pins 136 located on the surface of lock plate 130. By engagement of lock bar 146 with selected locate pins on lock plate 130, the angular direction of movement of drill rig 10 is predetermined. In a preferred embodiment, multiple locate pins 136 provide multiple directions of possible predetermined alignment. By appropriate selection, the various drill rig relocation systems may be arranged to obtain different movements of drill rig 10, such as forward, reverse, sideways, and rotate.

Mat assembly 170 includes a bearing mat 172. Mat 172 has an upper surface 174 and an opposite bottom surface 176 (best seen in FIG. 3) for contacting the ground.

A slide housing 180 is located on top surface 174 of mat 172. A pair of brackets 182 is located on top surface 174 of mat 172 for connection to translation cylinders 200. As illustrated, brackets 182 may be connect to, or be integral with, slide housing 180.

FIG. 3 is an isometric view of drill rig relocation system 100 as would be located on one corner of base box assembly 10, now illustrated from a viewpoint slightly beneath the mechanism. As seen in FIG. 3, lift assembly 120 includes a thrust plate 140 attached to the bottom side of lift frame 102. Optionally, a flange 112 (not shown) may be located on each side of opening 110 to facilitate connection of thrust plate 140 to lift frame 102. An opening 142 (see FIGS. 4 and 5) is provided in thrust plate 140 for vertical passage of shaft 124.

Figure 4:
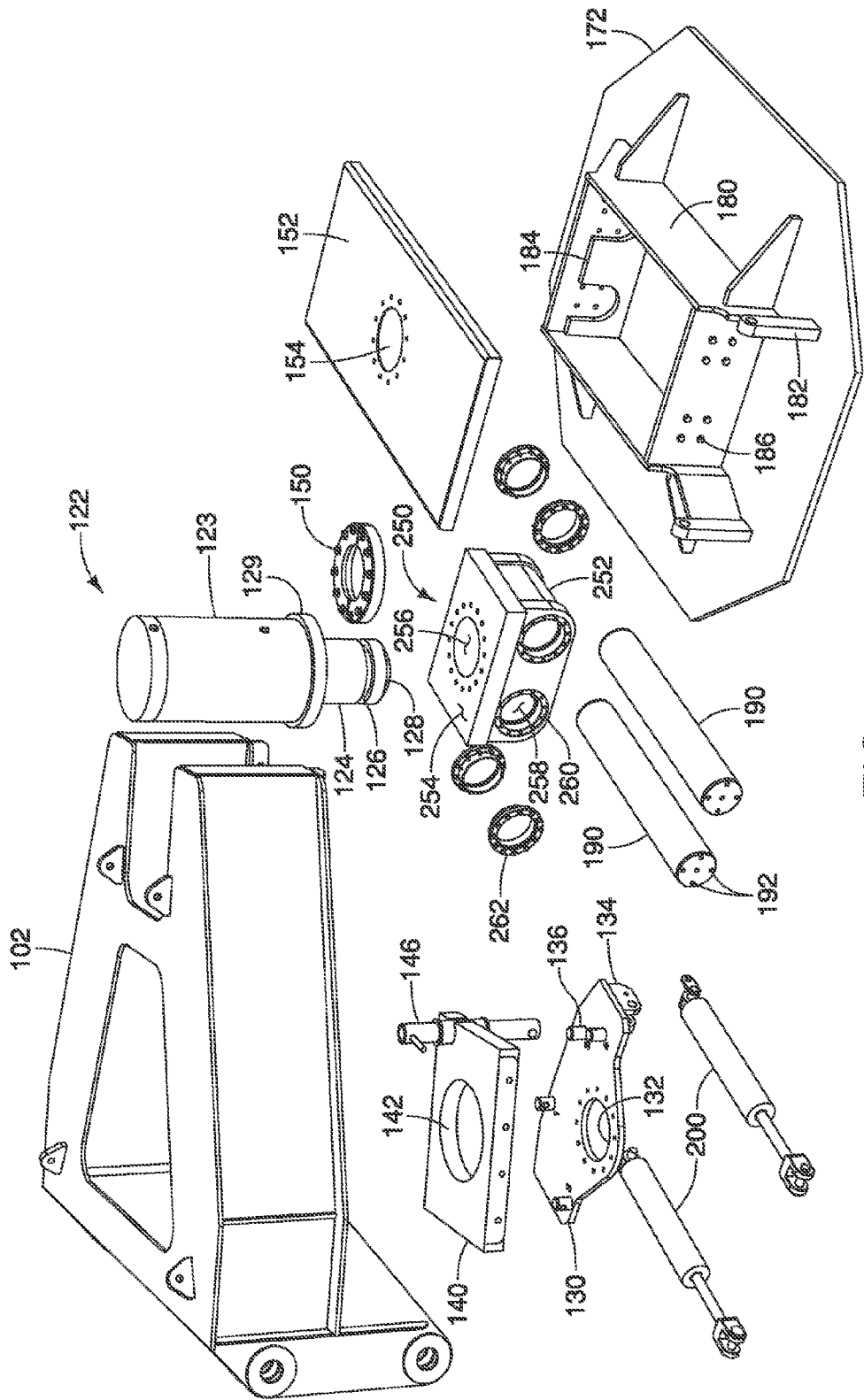
FIG. 4 is an isometric exploded view of the drill rig relocation system illustrated in FIGS. 2 and 3 from a viewpoint above the mechanism.
Figure 5:
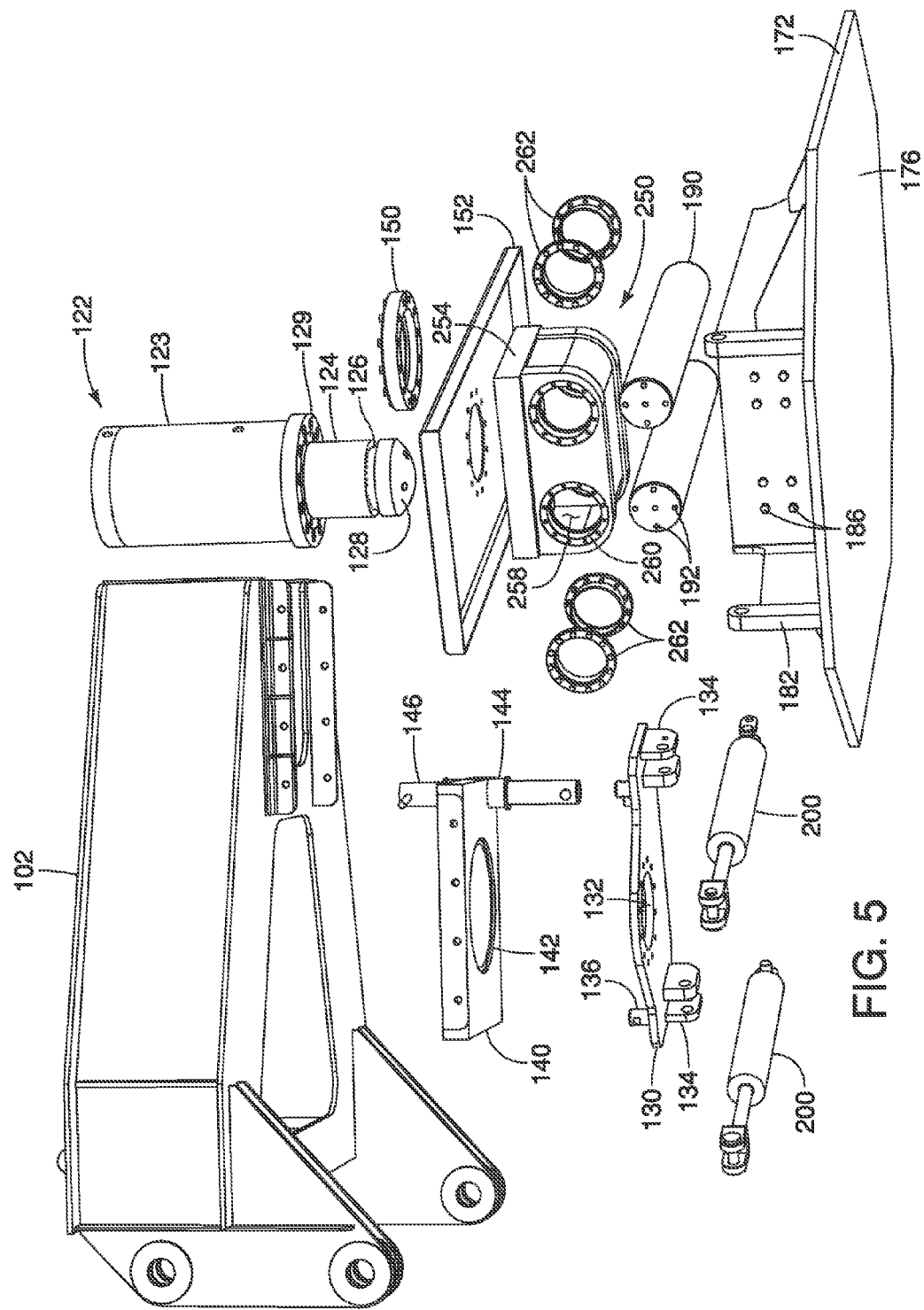
FIG. 5 is an isometric exploded view of the drill rig relocation system illustrated in FIGS. 2 and 3 from a viewpoint beneath the mechanism.
Figure 5A:
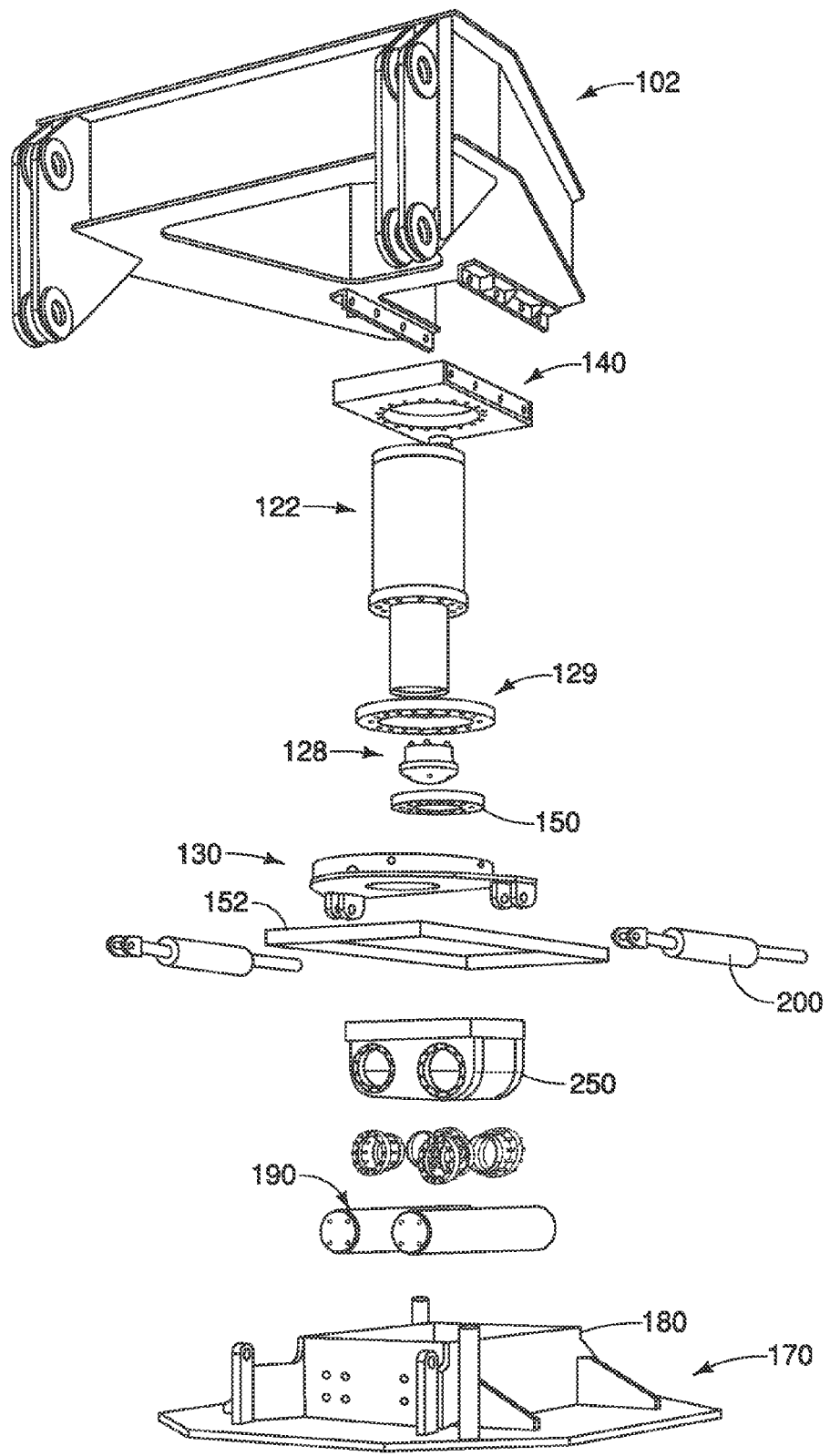
FIG. 5A is an isometric exploded view of the drill rig relocation system illustrated in FIGS. 2 and 3 from a side-view of the mechanism.

FIG. 4 is an isometric exploded view of drill rig relocation system 100 from a viewpoint above mechanism 100. FIG. 5 is another isometric exploded view of drill rig relocation system 100 from a viewpoint beneath mechanism 100. FIG. 5A is an isometric exploded view of drill rig relocation system 100 from a side-view of the mechanism.

Referring first to FIG. 5, lift cylinder 122 is seen to have a number of distinguishing features. Lift cylinder 122 is generally comprised of a body 123, a preload plate 129 (see FIG. 5A) and a shaft 124. Shaft 124 has a relief portion 126, and a spherical bearing end 128 (see FIG. 5A). As stated above and as illustrated in FIG. 3, lift cylinder 122 is secured to thrust plate 140 by preload plate 129, and located in opening 110 of lift frame 102.

Referring back to FIG. 4, a bearing housing 250 is provided. Bearing housing 250 is comprised of a bearing frame 252 and a load plate 254. Load plate 254 has a cavity 256 which receives spherical end 128 of lift cylinder 122 in rotatable, load-bearing relation. A retainer plate 150 is located in relief portion 126 and connected 126 to load plate 254 of bearing housing 250. In this manner, bearing housing 250 is rotatably connected to lift cylinder 122.

Still referring to FIG. 4, a pair of axially aligned circular orifices 258 is located on bearing housing 250 to create a passage through bearing housing 250. In the preferred embodiment, at least a pair of orifices 258 is located on bearing housing 250. A linear sleeve bearing 260 is located in each orifice 258. A bearing retainer 262 is attached to bearing housing 250 to hold linear sleeve bearing 260 in place in orifice 258.

A cylindrical slide 190 is provided for positioning inside each sleeve bearing 260 pair, in slidable relation to each sleeve bearing 260 pair. In one preferred embodiment, bearing retainer 262 included a seal component that creates a primary seal of the interior of bearing housing 250. The sealed interior of bearing housing 250 can thus be filled with a lubricant, such as a grease compatible with the materials of the sleeve bearings 260 and cylindrical slides 190. Sealed bearing housing 250 thus provides a primary containment system for sleeve bearings 260 where engaged with cylindrical slides 190, thus providing a continuously lubricated slide system that is protected from environmental contamination.

In one preferred embodiment, a pair of cylindrical slides 190 is provided in each bearing housing 250. In this manner, the vertical height of bearing housing 250 is substantially reduced, and the stability of mechanism 100 is substantially increased. A low vertical profile is important to determination of the lifting range of drill rig 10. Another advantage of this configuration is that the load distribution on sleeve bearings 260 is divided. Another advantage of this configuration is that parallel cylindrical slides 190 provide increased stability during sliding translation under load. Another advantage of this configuration relates to the reduced cost of smaller components.

As illustrated in FIG. 4, slide housing 180 of mat assembly 170 may also include a cradle 184 at each end. Cylindrical slide 190, with bearing housing 250 in place, is mounted inside slide housing 180. If cradle 184 is provided, each end of cylindrical slide 190 is located in cradle 184. Cylindrical slide 190 may be secured to slide housing 180 by fasteners 186 or other suitable means. A set of fastener mounts 192 are located at opposite ends of the cylindrical slide 190 to facilitate engagement with the fasteners 186. As best seen in FIGS. 5 and 2, a housing cover 152 is provided. Cover 152 has an opening for the passage of shaft 124. Housing cover 152 is attached to bearing housing 250. Cover 152 is large enough to cover slide housing 180 and thereby form an enclosure that encases bearing housing 250 and cylindrical slides 190.

Slide housing 180 and slide housing cover 152 form a primary containment system for protection of the surfaces external of bearing housing 250. Slide housing 180 and slide housing cover 152 form a secondary containment system and barrier to environmental contamination of the sleeve bearing 260 to cylindrical slide 190 interface, providing unprecedented protection for the slide surface interface in a drill rig relocation system. As a result, the native environment is protected from the substantial volume of lubricant within bearing housing 250, and cylindrical slides 190 and sleeve bearings 260 are protected from otherwise certain contamination from the surrounding native environment.

In the general configuration of components thus illustrated and described, raising of bearing housing 250 raises mat assembly 170. Lowering of bearing housing 250 (by extension of lifting cylinder 122) lowers mat assembly 170 until bottom surface 176 of bearing mat 172 contacts the ground. Continued extension of lift cylinder 122 transfers the weight of drill rig 10 from the interface between the ground and base boxes 12 and 14 to spherical bearing end 128 of lift cylinder 122 of each drill rig relocation system 100. The force on bearing end 128 is applied to spherical cavity 256 of load plate 254. The force on load plate 254 is applied to sleeve bearings 260 as against cylindrical slide 190. The force on cylindrical slide 190 is applied to slide housing 180, and to bottom surface 176 of mat 172, which is opposed by the ground.

In one embodiment, cylindrical slides 190 are made of non-corrosive, stainless steel, requiring no chrome or other oxidation-resistant coatings or chemicals. In one embodiment, sleeve bearings 260 are made of a Duralon® material.

Figure 6:
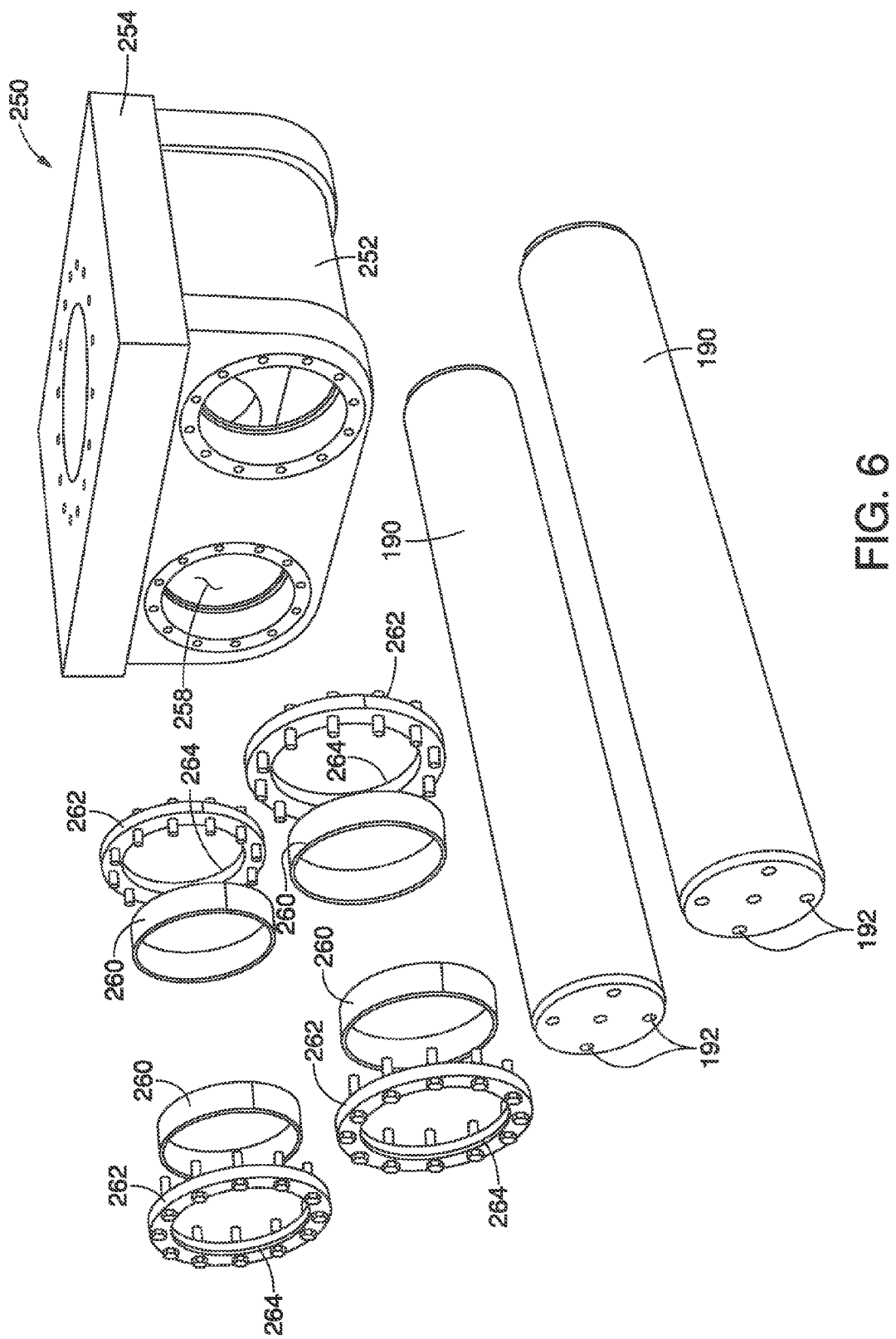
FIG. 6 is an exploded view of the bearing housing, bearings, retainers, and cylindrical slides of the embodiment illustrated in FIGS. 4 and 5.

FIG. 6 is an exploded view of bearing housing 250, sleeve bearings 260, bearing retainers 262, and cylindrical slides 190 with fastener mounts 192 located on an end thereof. Also visible in this view are seals 264, located in bearing retainers 262. With seals 264 located substantially adjacent to each linear sleeve bearing 260 in sealing and sliding engagement with a cylindrical slide 190, bearing housing 250 forms a primary sealed enclosure over at least a portion of each cylindrical slide 190.

Figure 7:
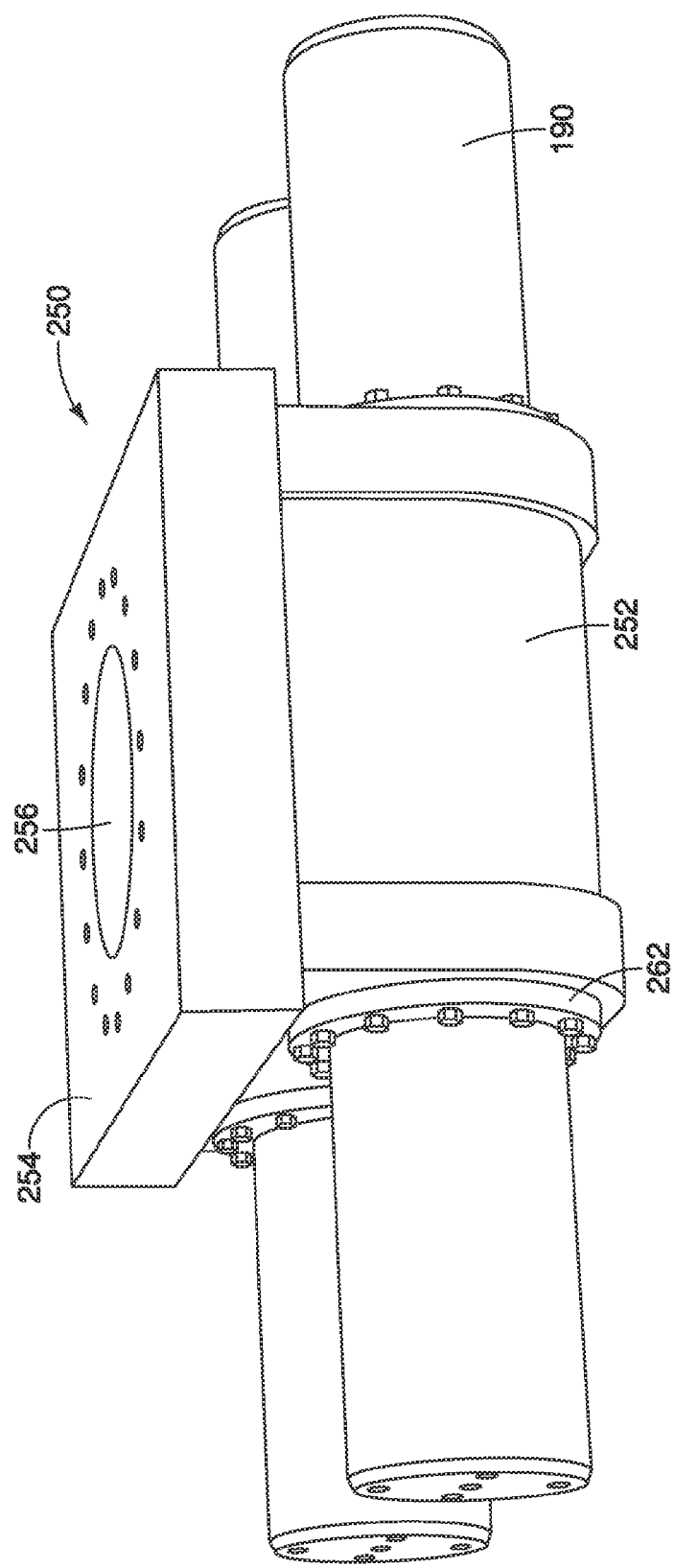
FIG. 7 is an isometric view of the bearing housing, bearings, retainers, and cylindrical slides of the embodiment illustrated in FIGS. 4 and 5, illustrated as assembled.

FIG. 7 is an isometric view of bearing housing 250, sleeve bearings 260, bearing retainers 262, and cylindrical slides 190, illustrated as assembled. In a preferred embodiment, bearing housing 250 is filled with a suitable lubricant to reduce friction. The illustrated assembly is lowered into slide housing 180, where cylindrical slides 190 are secured to slide housing 180 via fasteners 186. As stated above and as shown in FIG. 2, slide housing cover 152 is located over the slide housing 180 to create a secondary containment zone for the protection of cylindrical slides 190 and bearing housing 250.

With bearing housing 250 located in slide housing 180, translation cylinders 200 are connected between lift assembly 120 and mat assembly 170. As stated above, lift assembly 120 is connected to lift frame 102, and mat assembly 170 is connected to the bottom of lift assembly 120. Lift assembly 120 is controllably expanded and contracted to control the relative vertical distance between lift frame 102 and mat assembly 170. Translation cylinders 200 are controllably expanded and contracted to control the horizontal distance between lift frame 102 and mat assembly 170.

Figure 8:
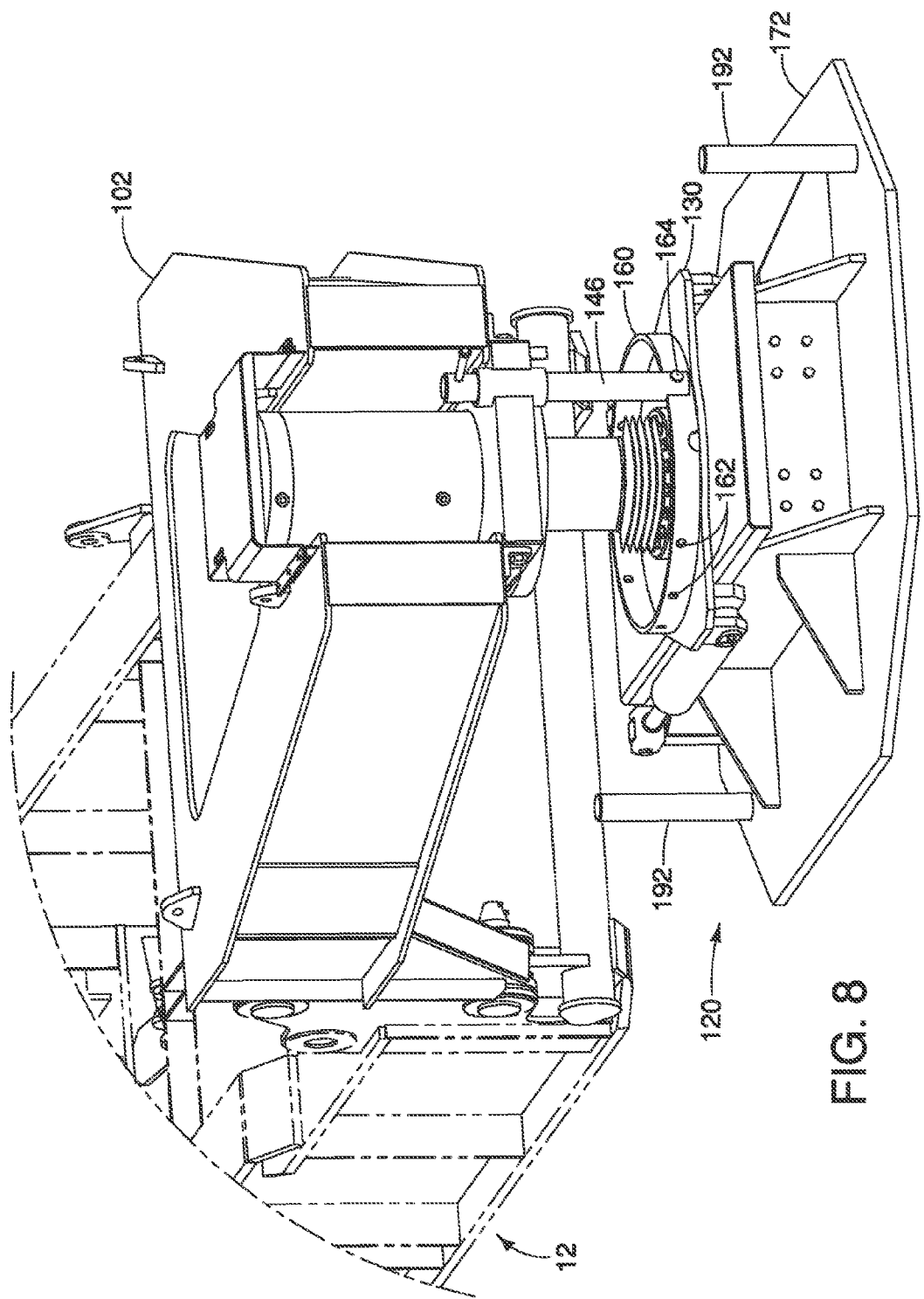
FIG. 8 is an isometric view of an alternative embodiment of the drill rig relocation system.

FIG. 8 is an isometric view of an alternative embodiment of drill rig relocation system 100. In this embodiment, a locate ring 160 is attached to the top of lock plate 130. A plurality of locate holes 162 are strategically located on locate ring 160. A key pin 164 is provided for connection of lock bar 146 to a selected locate hole 162. In this manner, the angular relationship between bearing mat 172 to base box 12 (or 14) is fixed. In one embodiment, handles 192 may be provided to facilitate manual rotation of mat assembly 170. Handles 192 may be integrally formed or connected to upper surface 174 of bearing mat 170.

Figure 9:
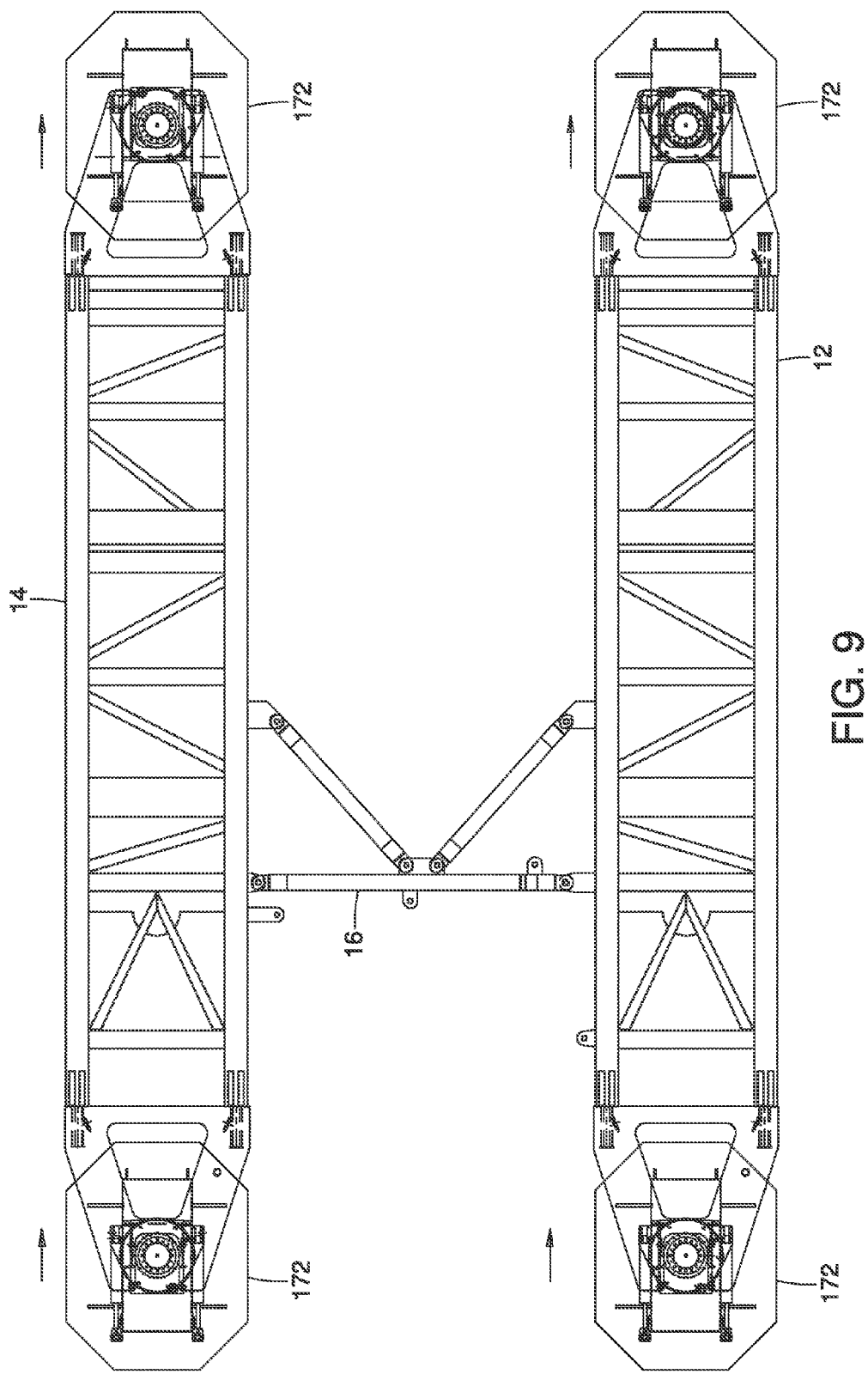
FIG. 9 is a top view schematic of a drill rig having the drill rig relocation system of the present invention, depicting the base boxes only, and illustrating the bearing mats oriented for forward movement of the drill rig.

FIG. 9 is a top view schematic of drill rig 10 having drill rig relocation system 100, depicting the base boxes 12 and 14 and base box spreader 16 only. FIG. 9 illustrates bearing mats 172 oriented for forward movement of drill rig 10 in the direction of the arrows shown. In FIG. 9

Figure 10:
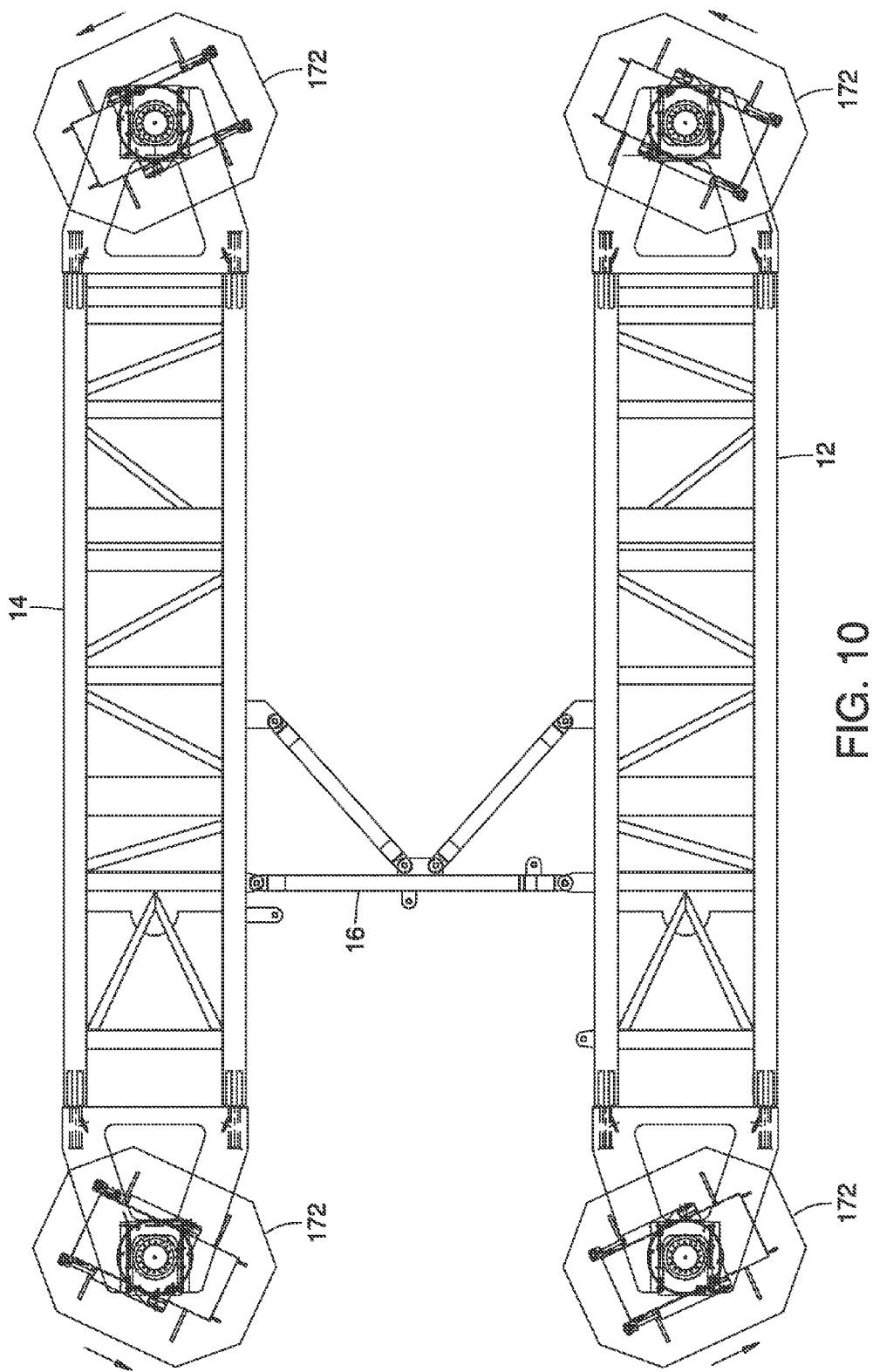
FIG. 10 is a top view schematic of a drill rig having the drill rig relocation system of the present invention, depicting the base boxes only, and illustrating the bearing mats oriented for rotational movement of the drill rig.

FIG. 10 is a top view schematic of drill rig 10 having drill rig relocation system 100, depicting the base boxes 12 and 14 and base box spreader 16 only. FIG. 10 illustrates bearing mats 172 oriented for rotational movement of drill rig 10 in the direction of the arrows shown. In FIG. 10, the drill rig relocation systems 100 are turning the drill rig 10 in a first direction.

Figure 11:
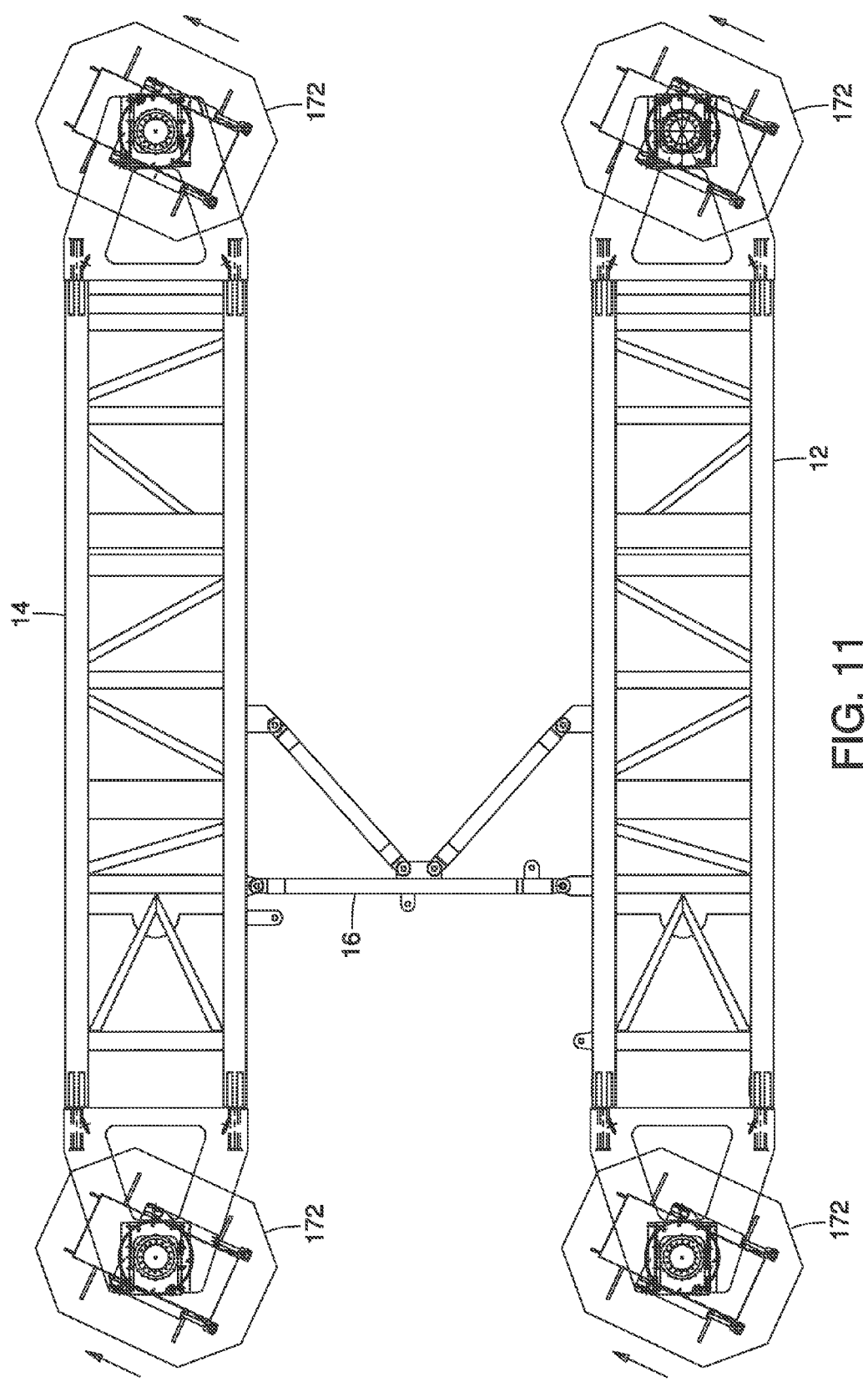
FIG. 11 is a top view schematic of a drill rig having the drill rig relocation system of the present invention, depicting the base boxes only, and illustrating the bearing mats oriented for angular movement of the drill rig.

FIG. 11 is a top view schematic of drill rig 10 having drill rig relocation system 100, depicting the base boxes 12 and 14 and base box spreader 16 only. FIG. 11 illustrates bearing mats 172 oriented for angular movement of drill rig 10 in the direction of the arrows shown. In FIG. 11, the drill rig relocation systems 100 allow for the drill rig 10 to move in a linear direction at an offset angle from the base boxes 12 and 14.

Figure 12:
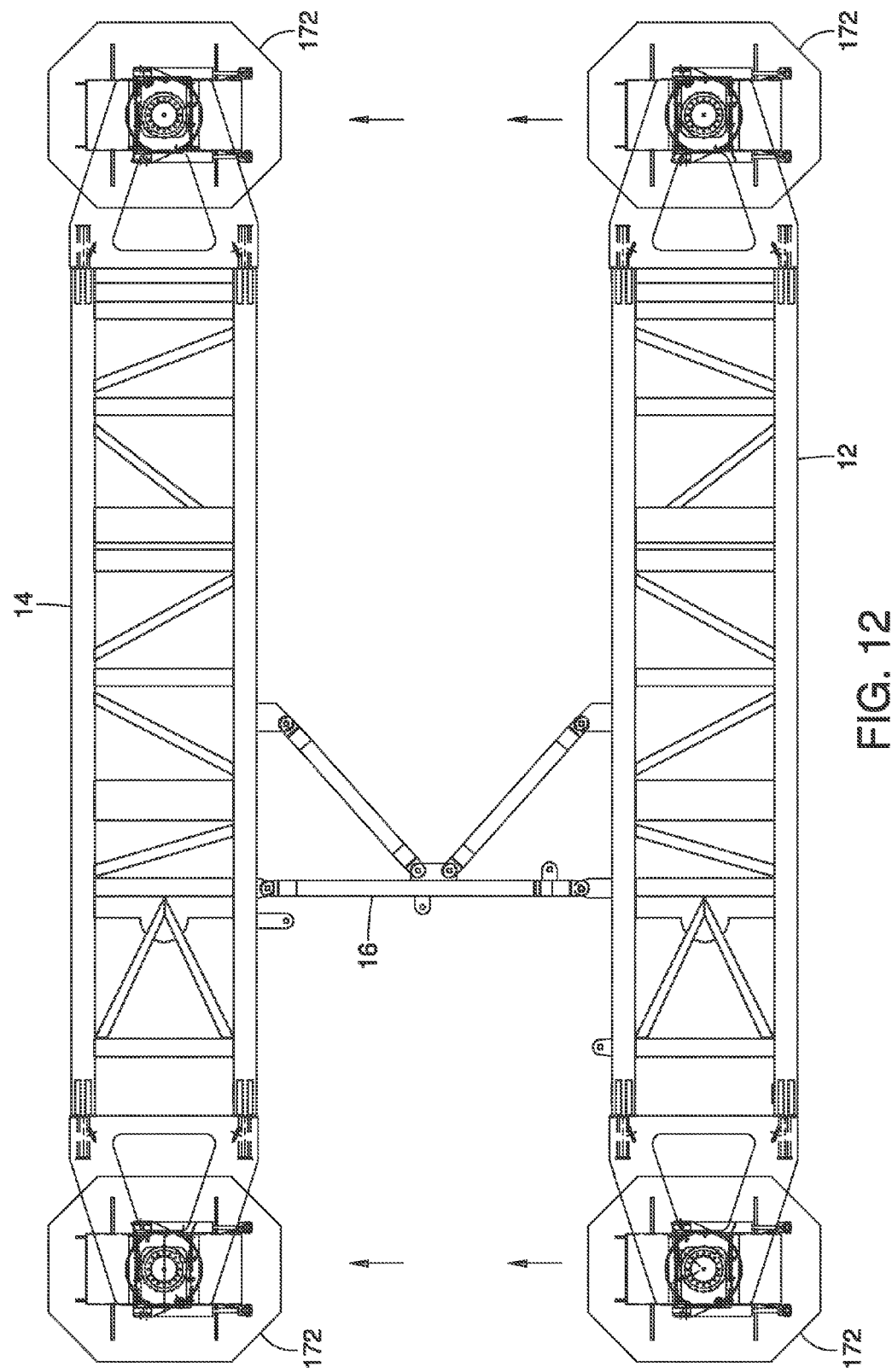
FIG. 12 is a top view schematic of a drill rig having the drill rig relocation system of the present invention, depicting the base boxes only, and illustrating the bearing mats oriented for sideways movement of the drill rig.

FIG. 12 is a top view schematic of drill rig 10 having drill rig relocation system 100, depicting the base boxes 12 and 14 and base box spreader 16 only. FIG. 12 illustrates bearing mats 172 oriented for sideways movement of drill rig 10 in the direction of the arrows shown. In FIG. 12, the drill rig relocation systems 100 allow for the drill rig 10 to move in a direction perpendicular of the base boxes 12 and 14.

As illustrated in FIGS. 9 through 12, drill rig relocation system 100 can be used to quickly relocate drill rig 10 by using one or more of the illustrated positions. In operation, a new location for drill rig 10 will be known in advance. Initially, lift cylinders 122 are retracted to raise bearing mats 174 off the ground. Mat assemblies 170 can then be manually rotated until the desired rotational position is located. Manual rotation may be conventionally facilitated by pushing or pulling on handles 192 if provided. Alternatively, rotation can be automated. The connection between spherical bearing end 128 of lift cylinders 122, and spherical cavity 256 of load plate 254 permits rotation of bearing mat assemblies 170 and lift frame 102.

Once bearing mat assemblies 170 are rotated to the desired direction for moving drill rig 10, the rotational position of mat assemblies 170 are locked in place. This can be accomplished in several ways. In one embodiment illustrated in FIGS. 2 and 3, lock bar 146 is engaged with locate pins 136. In another embodiment illustrated in FIG. 8, lock bar 146 is engaged with locate holes 162 on locate ring 160, such as with key pin 164. The presence of locate pins 136 and locate holes 162 provides an accurate selectable rotational position of each mat assembly 170 for coordinated and smooth sliding movement of drill rig 10. Other means of locking the rotational position of mat assembly 170 are available, and their use does not diminish the spirit of the present invention in any way.

With mat assemblies 170 locked in the desired rotational position, lift cylinders 122 are then expanded until bearing mat assemblies 170 contact the ground. Continued expansion of lift cylinders 122 transfers the weight of drill rig 10 from the base boxes 12, 14 to ground interface, to the bearing mat bottom 176 to ground interface. Expansion of lift cylinders 122 is continued until the desired ground clearance is achieved.

In this position, the weight of drill rig 10 is supported on linear sleeve bearings 260 slideably mounted on cylindrical slides 190, which are mounted in bearing mat assemblies 170. Translation cylinders 200 are then expanded (or contracted), causing linear sleeve bearings 260 to slide forward on cylindrical slides 190. This movement advances drill rig 10 in the direction of alignment of each mat assembly 170 (see FIGS. 9-12). When translation cylinders 200 reach their maximum expansion (or contraction), drill rig 10 will be set back on the ground by retraction of lift cylinders 122. Retraction of lift cylinders 122 causes base boxes 12, 14 to engage the ground and bearing mat assemblies 170 will then again be lifted off the ground.

In this position, translation cylinders 200 are fully retracted, causing linear sleeve bearings 260 to traverse to the opposite end of cylindrical slides 190. This again provides linear bearings 260 with the full length of cylindrical slides 190 for the next movement of drill rig 10. The cycle can be repeated as necessary until drill rig 10 reaches its intended destination.

Figure 13:
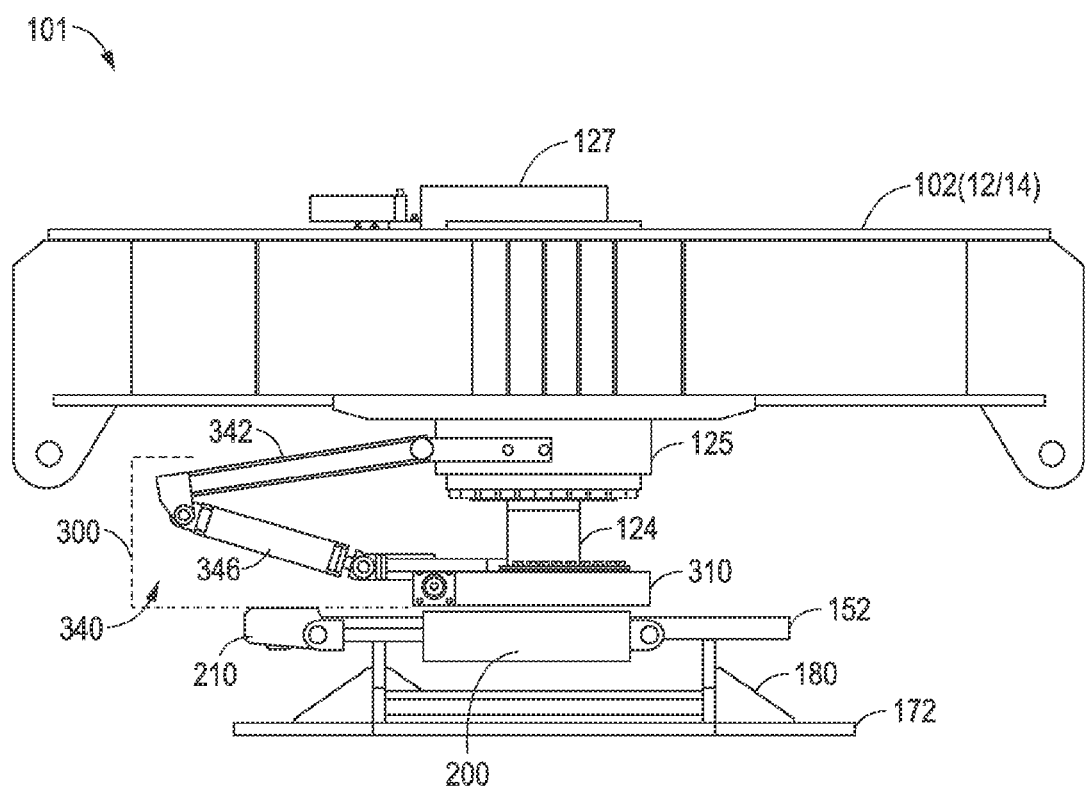
FIG. 13 is a side view of the drill rig relocation system disclosing features of certain alternative embodiments of the invention, illustrating the raising cylinder in an extended position.

FIGS. 13-17 disclose features of certain alternative embodiments to the drill rig relocation system 100 described above. FIG. 13 is a side view of drill rig relocation system 101 for drill rig movement, illustrating raising cylinder 122 (hidden from view) in an extended position.

Figure 14:
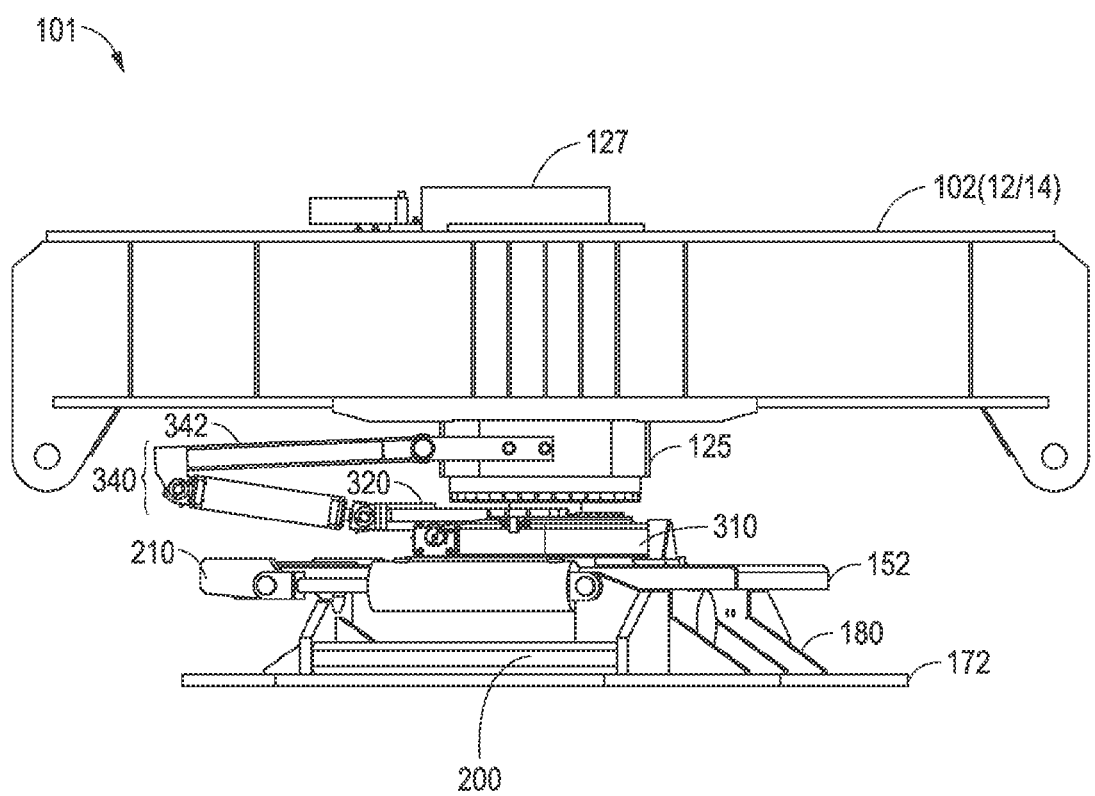
FIG. 14 is a side view of the drill rig relocation system disclosing features of certain alternative embodiments of the invention, illustrating the raising cylinder in a retracted position.

FIG. 14 illustrates drill rig relocation system 101 in a retracted position. As best seen in FIG. 13, drill rig relocation system 101 has a rotation system 300. Rotation system 300 replaces numerous components of drill rig relocation system 100, such as thrust plate 140, lock plate 130 and lock bar 146. A cylinder flange 125 may be provided to replace thrust plate 140 to permit secure attachment of lift cylinder 122 directly to lift frame 102 component of the drill rig base boxes (12 and 14). Lift frame 102 in this embodiment is preferably an integral component on each end of driller's side base box 12 and on each end of the off-driller's side base box 14. A control manifold 127 may be provided directly or remotely on lift cylinder 122 for control of lift cylinder 122.

In the embodiment illustrated, a translation bracket 210 is provided on, or integral to, housing cover 152. Translation cylinders 200 are connected at one end to translation bracket 210. Translation cylinders are connected at their opposite end to slide housing 180, or otherwise to mat assembly 170 (see FIG. 2). In this configuration, translation cylinders 200 are connected between lift assembly 120 and mat assembly 170 as in the previously described embodiment, to provide relative movement between them. (See FIG. 2).

Referring to FIGS. 13 and 14, rotation system 300 includes a slew drive 310 mounted to housing cover 152, and a torque arrest system 340 connected between slew drive 310 and cylinder flange 125. Slew drive 310 controllably rotates drill rig relocation system 101 into a desired rotation position, such as shown in FIGS. 9-12. This eliminates the need for manual positioning of each drill rig relocation system 101. Torque arrest system 340 absorbs destructive torque forces and allows vertical movement of the torque reaction point as the substructure is elevated to control the orientation and magnitude of forces.

Figure 15:
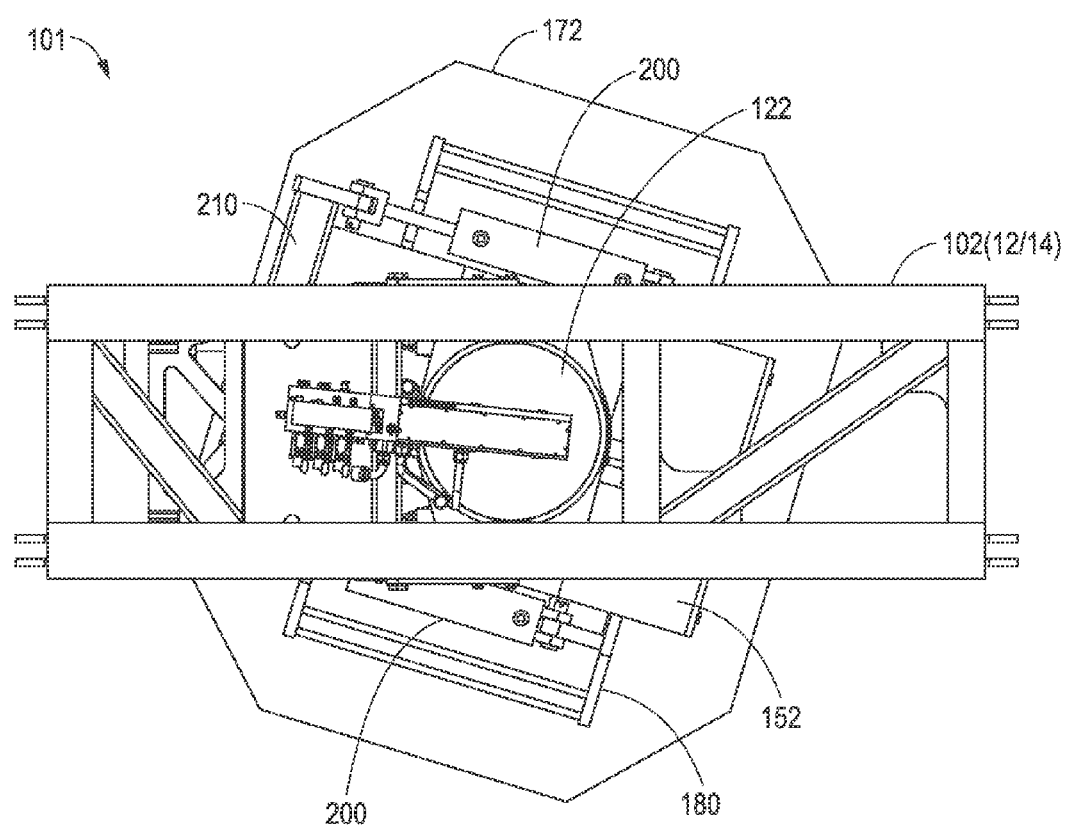
FIG. 15 is a top view of the drill rig relocation system disclosing features of certain alternative embodiments of the invention, illustrating the bearing mat rotated in relationship to the substructure.
Figure 16:
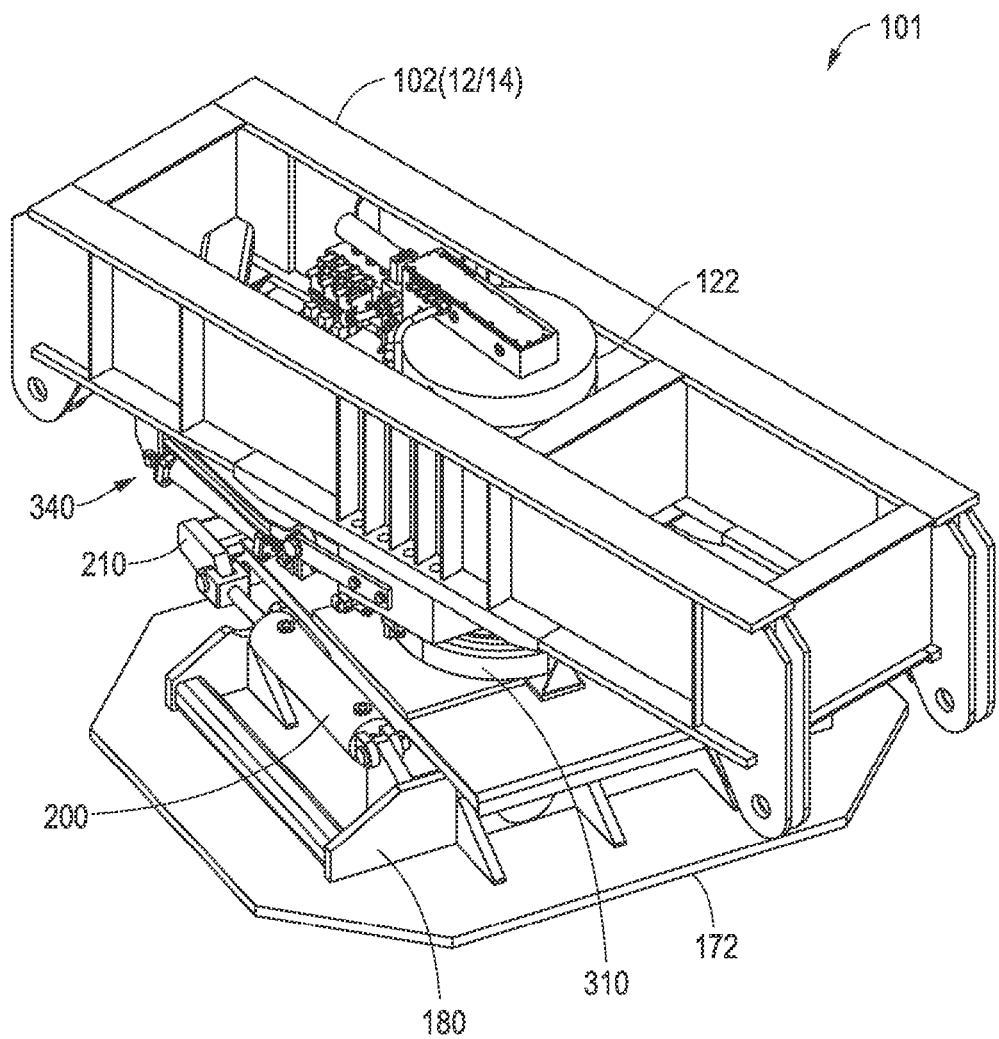
FIG. 16 is a side isometric view of the alternative embodiments of the invention disclosed in FIGS. 13-15, illustrating the bearing mat rotated in relationship to the substructure

FIG. 15 is a top view of drill rig relocation system 101 illustrating bearing mat 172 rotated in relationship to base boxes 12 and 14 of the drill rig substructure. FIG. 16 is a side-isometric view of drill rig relocation system 101, illustrating bearing mat 172 rotated in relationship to base boxes 12 and 14 of the drill rig substructure.

Figure 17:
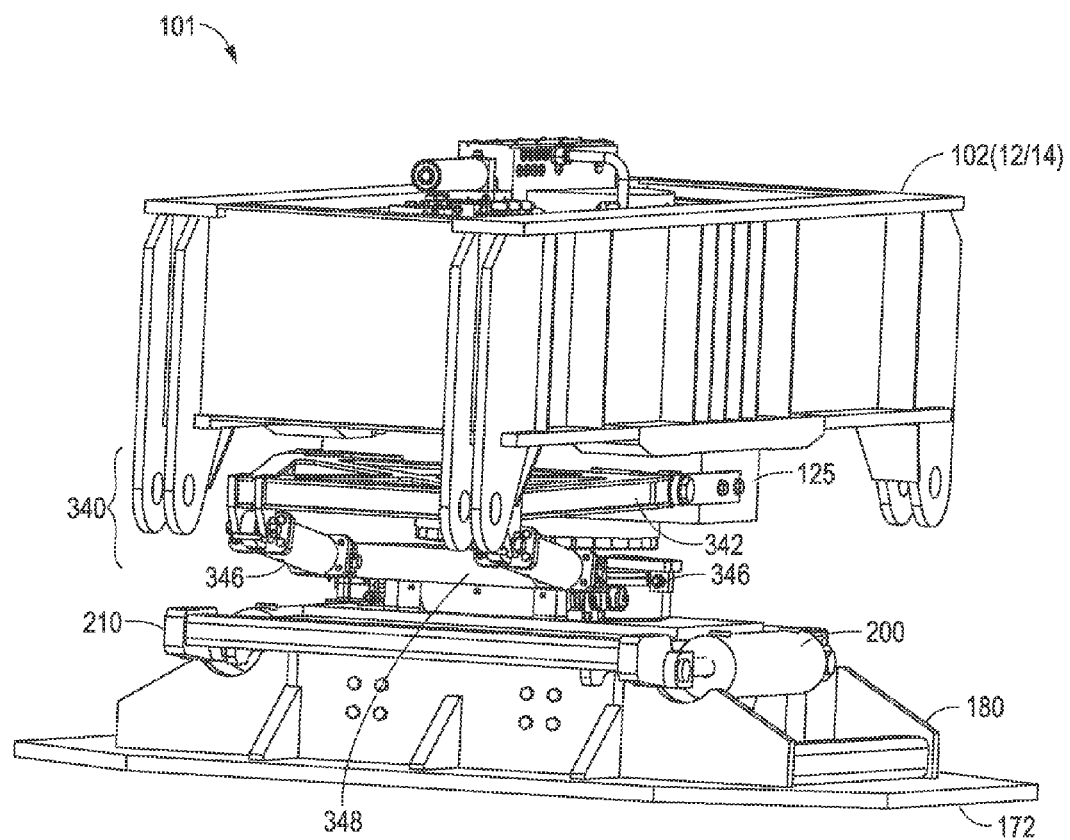
FIG. 17 is a side isometric view of the alternative embodiments of the invention disclosed in FIGS. 13-16.
Figure 18:
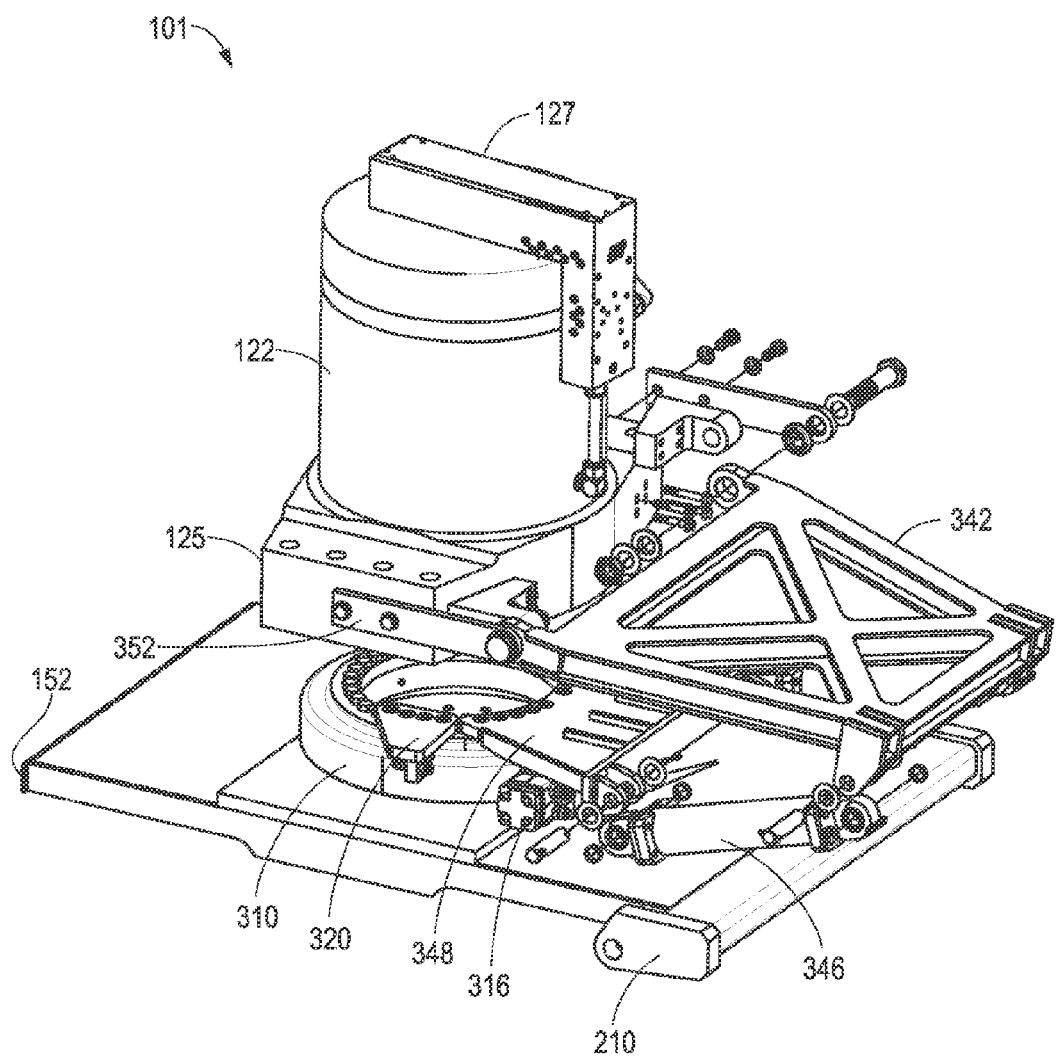
FIG. 18 is a partially exploded view of the drill rig relocation system disclosing features of the alternative embodiments of the invention disclosed in FIGS. 13-17.
Figure 19:
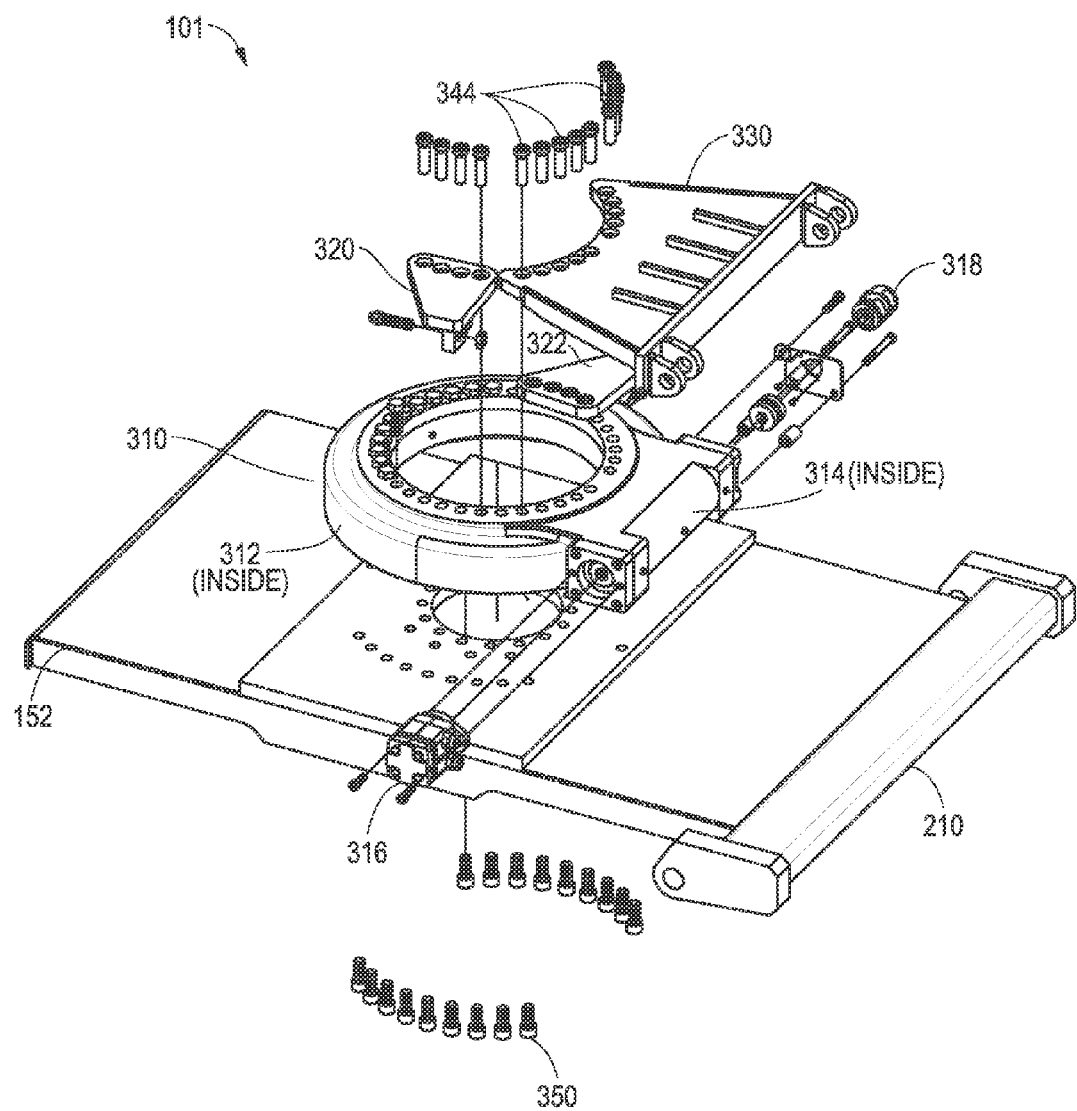
FIG. 19 is an exploded view of certain elements of the alternative embodiments of the invention disclosed in FIGS. 13-17.

FIG. 17 is a side isometric view of drill rig relocation system 101. FIG. 18 is a partially exploded view of the same embodiment. FIG. 19 is an exploded view of certain elements of the alternative embodiments of drill rig relocation system 101 as disclosed in FIGS. 13-17.

Referring to FIG. 17, a first end of torque link 342 is pivotally connected to cylinder flange 125. As shown here, an intermediate bracket 352 (best seen in FIG. 18) may be used for that purpose when convenient.

Referring to FIG. 18, a drive flange 348 is securely connected to slew drive 310, such as by fasteners 344. One or more spring links 346 is pivotally connected at each end between drive flange 348 and a second end of torque link 342. Thus, in the embodiment illustrated, torque link 342 and spring links 346 form a pivoting "V" shape linkage in the side view. Spring links 346 are shock absorbing. In one embodiment, spring links 346 contain a plurality of Belleville springs, and may be adjusted to set a preload on spring link 346.

Referring to FIG. 19, slew drive 310 is secured to housing cover 152 such as by fasteners 350. Slew drive 310 has a ring gear 312 mounted therein. A drive gear 314 is also mounted inside slew drive 310, in engagement with ring gear 312. A drive motor 316, such as a hydraulic motor, is connected to drive gear 314 such that actuating drive motor 316 operates to rotate drive gear 314 and ring gear 312. This causes rotation of slew drive 310 and mat assembly 170 relative to lift assembly 120 and base boxes 12 and 14. Actuation of drive motor 316 is only performed when lift cylinder 122 is retracted and mat assembly 170 is raised off the ground.

An encoder 318 is connected to drive gear 314. Encoder 318 provides precise electronically communicated information as to the number of revolutions of drive motor 316, and thus of the rotated direction of mat assembly 170 (see FIG. 1). A first stop 320 and a second stop 322 are connectable to slew drive 310 to provide maximum rotation points. First stop 320 and second stop 322 provide end points for calibrating the range of motion for encoder 318. Feedback from encoder 318 on each mat assembly 170 permits precise directional movement of the drill rig. This is necessary for safety, efficiency, and the longevity of the drill rig relocation system 101.

Drill rig relocation system 101 is controllable by electronic handsets, which can be hardwired or wirelessly connected to drive motors 316 and to control manifolds 127 to fully automate the operation of drill rig relocation system 101. Another advantage of drill rig relocation system 101 is that it provides an electronic read-out for precise position indication of each bearing mat assembly 170, reducing the potential for error and further increasing the safety of the workforce and equipment. This also permits precise positioning of the drill rig at infinite rotational points between definable stop limits, which allows for most efficient, precise, and safe movement of the drill rig. Another advantage of drill rig relocation system 101 is that it provides an electronically controllable system with alarm points and process checks to prevent accidents.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A drill rig relocation system, comprising:
a first end of a lift cylinder connected to a base box of a drill rig;
a bearing housing rotatably connected to a second end of the lift cylinder;
a bearing mat, having a ground side and an opposite top side;
a slide housing extending above the top side of the bearing mat;
a cylindrical slide shaft supported on the slide housing;
a linear sleeve bearing mounted in the bearing housing, and positioned on the slide shaft in slidable relation;
an extendable translation cylinder connected at one end to the top side of the bearing mat, and connected at its opposite end to the bearing housing; and,
wherein extension of the translation cylinder results in horizontal displacement between the bearing mat and the bearing housing.

2. The drill rig relocation system according to claim 1, further comprising:
a lock plate connected to the bearing housing; and,
a lock bar selectively connectable to the lock plate to lock the lock plate in a predetermined rotational position relative to the lift frame.

3. The drill rig relocation system according to claim 1, further comprising:
a thrust plate mounted to the lift frame, and having an opening for receiving the extendable shaft; and,
a preload plate securing the lift cylinder to the thrust plate.

4. The drill rig relocation system according to claim 1, further comprising:
a spherical bearing end located on the end of the extendable shaft of the lift cylinder;
a substantially circumferential relief on the extendable shaft;
a load plate forming the top of the bearing housing;
a cavity in the load plate for receiving the spherical bearing end in rotatable engagement;
a bearing retainer located in the relief of the shaft, in rotatable engagement with the shaft; and,
the bearing retainer being connected to the load plate.

5. The drill rig relocation system according to claim 1, further comprising:
the bearing housing having a plurality of linear sleeve bearings mounted in orifices on the bearing housing; and,
a plurality of cylindrical shafts, each shaft being mounted between a slide bearing pair.

6. The drill rig relocation system according to claim 1, the bearing housing further comprising:

a bearing frame;
a plurality of orifices located in the bearing frame, the slide shaft mounted in the orifices;
a load plate on top of the bearing frame; and,
wherein the bearing housing forms an enclosure over at least a portion of the cylindrical slide shaft.

7. The drill rig relocation system according to claim 1, further comprising:
a seal located substantially adjacent to the linear sleeve bearing in sealing and sliding engagement with the cylindrical slide shaft; and,
wherein the bearing housing forms a sealed enclosure over at least a portion of the cylindrical slide shaft.

8. The drill rig relocation system according to claim 7, further comprising:
a volume of lubricant contained in the bearing housing.

9. The drill rig relocation system according to claim 6, further comprising:
a housing cover attached to the load plate; and,
the housing cover and slide housing forming an enclosure that substantially encloses the bearing housing and cylindrical shaft.

10. A drill rig relocation system, comprising:
a lift cylinder having a cylinder frame, the cylinder frame connected to a base box of a drill rig;
a bearing housing rotatably connected to a lower end of the lift cylinder;
a slew drive mounted on top of the bearing housing;
a bearing mat, having a ground side and an opposite top side;
a slide housing extending above the top side of the bearing mat;
a cylindrical slide shaft supported on the slide housing;
a linear sleeve bearing mounted in the bearing housing, and positioned on the slide shaft in slidable relation; and,
an extendable translation cylinder connected at one end to the top side of the bearing mat, and connected at its opposite end to the bearing housing; and,
wherein extension of the translation cylinder results in horizontal displacement between the bearing mat and the bearing housing.

11. The drill rig relocation system according to claim 10, further comprising:
a torque arrest connected between the slew drive and the cylinder frame, the torque arrest further comprising:
a drive flange connected to the slew drive;
a torque link pivotally connected to the lift cylinder frame; and,
a spring link pivotally connected between the torque link and the drive flange.

12. The drill rig relocation system according to claim 11, further comprising:
the spring link comprising a preloaded spring assembly.

13. The drill rig relocation system according to claim 10, further comprising:
a drive motor is connected to the slew drive such that actuating the drive motor rotates the slew drive and the bearing mat.

14. The drill rig relocation system according to claim 10, further comprising:
an encoder connected to the slew drive to determine and electronically communicate a rotational position of the bearing mat.

15. The drill rig relocation system according to claim 10, further comprising:
a torque arrest connected between the slew drive and the cylinder frame, the torque arrest further comprising:
a drive flange connected to the slew drive;
a torque link pivotally connected to a first location on the cylinder frame offset to a centerline of the lift cylinder, and to a second location on the cylinder frame offset to the opposite side of the centerline of the lift cylinder;
a first spring link pivotally connected to a first location on the drive flange offset to the centerline of the lift cylinder; and,
a second spring link pivotally connected to a second location on the drive flange offset to the opposite side of the centerline of the lift cylinder.

16. The torque arrest according to claim 15, further comprising:
the first and second spring links being independently compressible and expandable upon contact of the bearing mat with the ground.

17. A drill rig relocation system, comprising:
a first end of a lift cylinder connected to a base box of a drill rig;
a bearing assembly rotatably connected to a second end of the lift cylinder;
a bearing mat, having a ground side and an opposite top side;
the top side of the bearing mat attached to the bearing assembly;
the bearing assembly having an extendable translation cylinder, extendable to move the bearing mat in substantially perpendicular relationship to the lift cylinder; and,
a torque arrest connected between the bearing assembly and the lift cylinder, the torque arrest further comprising:
a torque link pivotally connected proximate to the lift cylinder; and,
a spring link pivotally connected to the torque link on one end, and pivotally connected proximate to the bearing assembly on its opposite end.

* * * * *